United States Patent
Charlton et al.

(10) Patent No.: US 11,750,767 B2
(45) Date of Patent: *Sep. 5, 2023

(54) SELECTIVE IDENTIFICATION AND ORDER OF IMAGE MODIFIERS

(71) Applicant: Snap Inc., Santa Monica, CA (US)

(72) Inventors: Ebony James Charlton, Santa Monica, CA (US); Michael John Evans, Venice, CA (US); Samuel Edward Hare, Los Angeles, CA (US); Andrew James McPhee, Culver City, CA (US); Robert Cornelius Murphy, Venice, CA (US); Eitan Pilipski, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/644,501

(22) Filed: Dec. 15, 2021

(65) Prior Publication Data
US 2022/0256101 A1    Aug. 11, 2022

Related U.S. Application Data

(63) Continuation of application No. 16/815,804, filed on Mar. 11, 2020, now Pat. No. 11,233,952, which is a
(Continued)

(51) Int. Cl.
*H04N 5/272*      (2006.01)
*G11B 27/34*      (2006.01)
(Continued)

(52) U.S. Cl.
CPC ............ *H04N 5/272* (2013.01); *G11B 27/11* (2013.01); *G11B 27/34* (2013.01); *H04N 23/62* (2023.01);
(Continued)

(58) Field of Classification Search
None
See application file for complete search history.

(56) References Cited

U.S. PATENT DOCUMENTS 666,223 A    1/1901   Shedlock
4,581,634 A  4/1986   Williams
(Continued)

FOREIGN PATENT DOCUMENTS

CA    2887596 A1    7/2015
CN    101968695 A   2/2011
(Continued)

OTHER PUBLICATIONS

U.S. Appl. No. 15/806,021 U.S. Pat. No. 10,623,666, filed Nov. 7, 2017, Selective Identification Order of Image Modifiers.
(Continued)

*Primary Examiner* — James M Hannett
(74) *Attorney, Agent, or Firm* — Schwegman Lundberg & Woessner, P.A.

(57) ABSTRACT

Systems, devices, media and methods are presented for presentation of modified objects within a video stream. The systems and methods select an object of interest depicted within a user interface based on an associated image modifier, determine a modifier context based at least in part on one or more characteristics of the selected object, identify a set of image modifiers based on the modifier context, rank a first portion of the identified set of image modifiers based on a primary ordering characteristic, rank a second portion of the identified set of image modifiers based on a secondary ordering characteristic and cause presentation of the modifier icons for the ranked set of image modifiers.

20 Claims, 19 Drawing Sheets

Related U.S. Application Data continuation of application No. 15/806,021, filed on Nov. 7, 2017, now Pat. No. 10,623,666.

(60) Provisional application No. 62/418,586, filed on Nov. 7, 2016.

(51) Int. Cl.
    *G11B 27/11*      (2006.01)
    *H04N 23/62*      (2023.01)
    *H04N 23/63*      (2023.01)

(52) U.S. Cl.
    CPC ......... *H04N 23/631* (2023.01); *H04N 23/635* (2023.01)

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,034,695 A | 3/2000 | Silva et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,768,486 B1 | 7/2004 | Szabo et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |

(56) References Cited

U.S. PATENT DOCUMENTS

| | | |
|---|---|---|
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 10,114,532 B2 * | 10/2018 | Krishnaswamy ....... G06T 11/60 |
| 10,623,666 B2 | 4/2020 | Charlton et al. |
| 11,233,952 B2 * | 1/2022 | Charlton ................ G11B 27/11 |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2002/0161561 A1 | 10/2002 | Sarma et al. |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0258656 A1 | 11/2007 | Aarabi et al. |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |

(56) References Cited

U.S. PATENT DOCUMENTS

| | | |
|---|---|---|
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0021421 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0008971 A1 | 4/2009 | Wood et al. |
| 2009/0089678 A1 | 4/2009 | Sacco et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0324103 A1 | 12/2009 | Gelfand et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0141784 A1 | 6/2010 | Yoo |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0174599 A1 | 7/2010 | Rosenblatt et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |

(56) References Cited

U.S. PATENT DOCUMENTS

| | | |
|---|---|---|
| 2012/0001651 A1 | 6/2012 | Lalancette et al. |
| 2012/0143760 A1 | 6/2012 | Abulafia et al. |
| 2012/0150978 A1 | 6/2012 | Monaco |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210232 A1 | 8/2012 | Wang et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormaid et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0016113 A1 | 1/2013 | Adhikari et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0184858 A1 | 7/2014 | Yu et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0160839 A1 | 6/2015 | Krishnaswamy et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |
| 2015/0312487 A1 | 10/2015 | Nomoto |
| 2015/0350136 A1 | 12/2015 | Flynn, III et al. |
| 2015/0363085 A1 | 12/2015 | Spjuth |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0030839 A1 | 2/2016 | Nair et al. |
| 2016/0085773 A1 | 3/2016 | Chang et al. |
| 2016/0085863 A1 | 3/2016 | Allen et al. |

(56) References Cited

U.S. PATENT DOCUMENTS

| | | |
|---|---|---|
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0321708 A1 | 11/2016 | Sehn |
| 2016/0321833 A1 | 11/2016 | Chong et al. |
| 2017/0006094 A1 | 1/2017 | Abou Mahmoud et al. |
| 2017/0032542 A1 | 2/2017 | Shankar et al. |
| 2017/0061308 A1 | 3/2017 | Chen et al. |
| 2017/0287006 A1 | 10/2017 | Azmoodeh et al. |
| 2018/0131878 A1 | 5/2018 | Charlton et al. |
| 2020/0213534 A1 | 7/2020 | Charlton et al. |

FOREIGN PATENT DOCUMENTS

| | | |
|---|---|---|
| CN | 101989173 A | 3/2011 |
| CN | 101390090 B | 11/2011 |
| CN | 104731446 A | 6/2015 |
| CN | 105849685 A | 8/2016 |
| CN | 109952610 A | 6/2019 |
| CN | 109952610 B | 1/2021 |
| CN | 112738408 A | 4/2021 |
| CN | 112738408 B | 9/2022 |
| EP | 1487195 A1 | 12/2004 |
| EP | 2051480 A1 | 4/2009 |
| EP | 2151797 A1 | 2/2010 |
| EP | 3535756 B1 | 7/2021 |
| GB | 2399928 A | 9/2004 |
| KR | 19990073076 A | 10/1999 |
| KR | 20010078417 A | 8/2001 |
| KR | 102163443 B1 | 9/2020 |
| KR | 102219304 B1 | 2/2021 |
| KR | 102257909 B1 | 5/2021 |
| KR | 102298379 B1 | 9/2021 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |
| WO | WO-2018085848 A1 | 5/2018 |

OTHER PUBLICATIONS

U.S. Appl. No. 16/815,804 U.S. Pat. No. 11,233,952, filed Mar. 11, 2020, Selective Identification Order of Image Modifiers.

"A Whole New Story", Snap, Inc., [Online] Retrieved from the Internet: <URL: https://www.snap.com/en-US/news/>, (2017), 13 pgs.

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 15/806,021, Examiner Interview Summary dated Apr. 25, 2019", 3 pgs.

"U.S. Appl. No. 15/806,021, Final Office Action dated Jul. 15, 2019", 8 pgs.

"U.S. Appl. No. 15/806,021, Non Final Office Action dated Feb. 20, 2019", 8 pgs.

"U.S. Appl. No. 15/806,021, Notice of Allowance dated Dec. 4, 2019", 7 pgs.

"U.S. Appl. No. 15/806,021, Response filed May 20, 2019 to Non Final Office Action dated Feb. 20, 2019", 12 pgs.

"U.S. Appl. No. 15/806,021, Response filed Nov. 15, 2019 to Final Office Action dated Jul. 15, 2019", 12 pgs.

"U.S. Appl. No. 16/815,804, Corrected Notice of Allowability dated Dec. 17, 2021", 2 pgs.

"U.S. Appl. No. 16/815,804, Examiner Interview Summary dated Apr. 29, 2021", 2 pgs.

"U.S. Appl. No. 16/815,804, Final Office Action dated Feb. 23, 2021", 7 pgs.

"U.S. Appl. No. 16/815,804, Non Final Office Action dated Oct. 6, 2020", 8 pgs.

"U.S. Appl. No. 16/815,804, Notice of Allowance dated Sep. 8, 2021", 7 pgs.

"U.S. Appl. No. 16/815,804, PTO Response to Rule 312 Communication dated Dec. 13, 2021", 2 pgs.

"U.S. Appl. No. 16/815,804, Response filed Jan. 6, 2021 to Non Final Office Action dated Oct. 6, 2020", 11 pgs.

"U.S. Appl. No. 16/815,804, Response filed Aug. 23, 2021 to Final Office Action dated Feb. 23, 2021", 10 pgs.

"BlogStomp", StompSoftware, [Online] Retrieved from the Internet: <URL: http://stompsoftware.com/blogstomp>, (accessed May 24, 2017), 12 pgs.

"Chinese Application Serial No. 201780068818.9, Notice of Decision to Grant dated Nov. 4, 2020", w/ English Translation, 5 pgs.

"Chinese Application Serial No. 201780068818.9, Office Action dated May 26, 2020", w/ English Translation, 16 pgs.

"Chinese Application Serial No. 201780068818.9, Response filed Oct. 10, 2020 to Office Action dated May 26, 2020", w/ English Claims, 63 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"European Application Serial No. 17801812.3, Communication Pursuant to Article 94(3) EPC dated Jun. 23, 2020", 6 pgs.

"European Application Serial No. 17801812.3, Response filed Nov. 3, 2020 to Communication Pursuant to Article 94(3) EPC dated Jun. 23, 2020", 24 pgs.

"European Application Serial No. 17801812.3, Response to Communication pursuant to Rules 161(1) and 162 EPC filed Sep. 16, 2019", 42 pgs.

"European Application Serial No. 21179843.4, Extended European Search Report dated Sep. 14, 2021", 9 pgs.

"InstaPlace Photo App Tell The Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report dated Sep. 29, 2015", 2 pgs.

"International Application Serial No. PCT/US2017/060427, International Preliminary Report on Patentability dated May 16, 2019", 8 pgs.

"International Application Serial No. PCT/US2017/060427, International Search Report dated Feb. 7, 2018", 5 pgs.

"International Application Serial No. PCT/US2017/060427, Written Opinion dated Feb. 7, 2018", 8 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

(56) References Cited

OTHER PUBLICATIONS

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RG0w>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobil Just Won Filters", TechCrunch, [Online] Retrieved from the Internet: <URL: https://techcrunch.com/2011/09/08/mobli-filters>, (Sep. 8, 2011), 10 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function and For Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.

"Chinese Application Serial No. 202110055054.8, Office Action dated Jan. 6, 2022", w/ English Translation, 9 pgs.

"Chinese Application Serial No. 202110055054.8, Response filed May 6, 2022 to Office Action dated Jan. 6, 2022", w/ English Claims, 12 pgs.

\* cited by examiner

SELECTIVE IDENTIFICATION AND ORDER OF IMAGE MODIFIERS

RELATED APPLICATIONS

This application is a continuation of U.S. patent application Ser. No. 16/815,804, filed on Mar. 11, 2020, which is a continuation of U.S. patent application Ser. No. 15/806,021, filed on Nov. 7, 2017, which claims the priority benefit of U.S. Provisional Application Ser. No. 62/418,586, filed on Nov. 7, 2016, each of which is hereby incorporated herein by reference in their entireties.

TECHNICAL FIELD

Embodiments of the present disclosure relate generally to automated identification and presentation of image capture modifiers. More particularly, but not by way of limitation, the present disclosure addresses systems and methods for identifying image modifiers based on image analysis of images within a field of view of an image capture device and interaction analysis of selections within a user interface.

BACKGROUND

Telecommunications applications and devices can provide communication between multiple users using a variety of media, such as text, images, sound recordings, or video recording. For example, video conferencing allows two or more individuals to communicate with each other using a combination of software applications, telecommunications devices, and a telecommunications network. Telecommunications devices may also record video streams to transmit as messages across a telecommunications network.

Although telecommunications applications and devices exist to provide two-way video communication between two devices, there can be issues with video streaming, such as modifying images within the video stream during pendency of a communication session. Telecommunications devices use physical manipulation of the device in order to perform operations. For example, devices are typically operated by changing an orientation of the device or manipulating an input device, such as a touchscreen. Accordingly, there is still a need in the art to improve video communications between devices and modifying video streams in real time while the video stream is being captured.

BRIEF DESCRIPTION OF THE DRAWINGS

Various ones of the appended drawings merely illustrate example embodiments of the present disclosure and should not be considered as limiting its scope.

Figure 1:
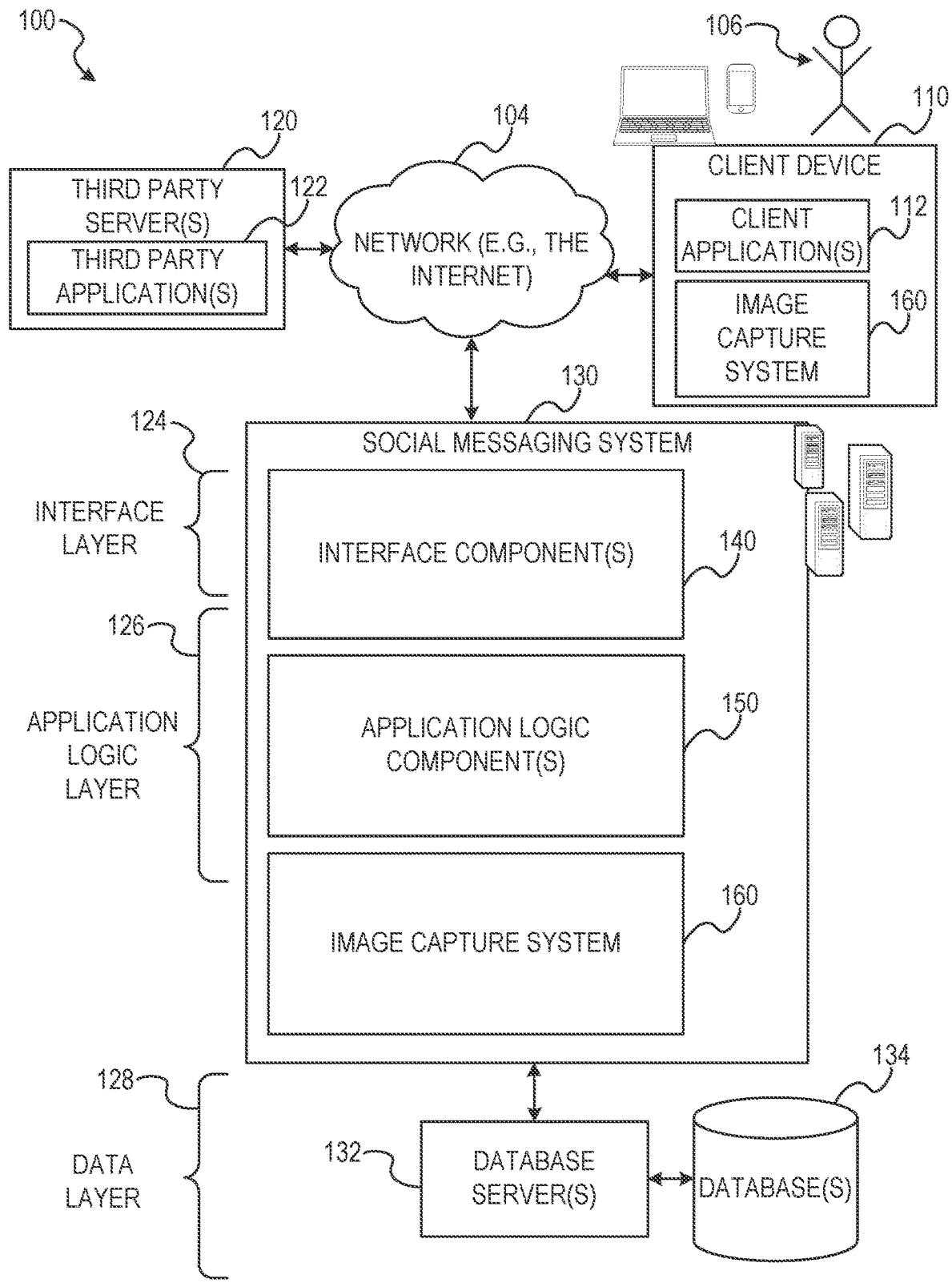
FIG. 1 is a block diagram illustrating a networked system, according to some example embodiments.

The headings provided herein are merely for convenience and do not necessarily affect the scope or meaning of the terms used.

DETAILED DESCRIPTION

Embodiments of the present disclosure relate generally to automated identification and presentation of image capture modifiers. More particularly, but not by way of limitation, the present disclosure addresses systems and methods for identifying image modifiers based on image analysis of images within a field of view of an image capture device and interaction analysis of selections within a user interface. The description that follows includes systems, methods, techniques, instruction sequences, and computing machine program products illustrative of embodiments of the disclosure. In the following description, numerous specific details are set forth in order to provide an understanding of various embodiments of the inventive subject matter. It will be evident to those skilled in the art that embodiments of the inventive subject matter may be practiced without these specific details. In general, well-known instruction instances, protocols, structures, and techniques are not shown in detail.

In some embodiments, when a user taps on a camera view (e.g., a real time or live field of view of an image capture device) within a user interface to activate an image modifier (e.g., an image filter, a digital lens, a set of add on graphical elements), a grouping or order is determined by modifier category among the modifiers initially activated. In such embodiments, this is an interpretation of an intent of the user. For example, tapping on a face in a field of view of a front facing camera may return a modifier category (e.g., filter category) of "SELFIE." The return of the specified modifier category is determined based on the identified target of the tap being a face in some such embodiments.

When adding a new modifier category (e.g., filter category, lens category, graphical element category), a user defines other categories which should appear within a presentation of image modifiers alongside the primary modifier category in some embodiments. The user selects a user interface element to add an image modifier or modifier category. The user may enter details relating to the category and select one or more secondary display categories. The secondary display categories may be input as an ordered list. After adding a category into the list, the user may alter or move the category to change the order in which the category appears in a presentation image modifiers (e.g., filters, lenses, or sets of add-on graphical elements).

In some example embodiments, to activate modifiers, the user enters an application, displaying a user interface. Once the user interface is displayed, a user intent is determined based on one or more of a tap, click, or other selection; image parameters; content of a field of view of an image capture device; sensor data indicating a position, orientation, or location of a computing device; and any other suitable data. Modifiers of a selected modifier category are ordered first within an ordered list of modifiers (e.g., filters, lenses, or sets of graphical elements). In some embodiments, a primary or main modifier category defines which other categories should be displayed and in which order.

The various embodiments of the present disclosure relate to devices and instructions by one or more processors of a device to modify an image or a video stream transmitted by the device to another device while the video stream is being captured (e.g., modifying a video stream in real time). An image capture system is described that identifies and tracks objects and areas of interest within an image or across a video stream and through a set of images comprising the video stream. In various example embodiments, the image capture system identifies modifiers suitable for a combination of an estimated or identified user intent and objects, scenes, or characteristics depicted within a field of view of an image capture device. In some instances, the image capture system (e.g., image capture system 160 described below) generates and modifies visual elements within the video stream based on data captured from the real-world environment.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface components (e.g., a web server) 140, which receives requests from various client-computing devices and servers, such as client devices 110 executing client application(s) 112, and third-party servers 120 executing third party application(s) 122. In response to received requests, the interface component 140 communicates appropriate responses to requesting devices via a network 104. For example, the interface components 140 can receive requests such as Hypertext Transfer Protocol (HTTP) requests, or other web-based, Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client devices 110 form all or part of an image capture system 160 such that components of the image capture system 160 configure the client device 110 to perform a specific set of functions with respect to operations of the image capture system 160.

In an example, the client devices 110 are executing the client application(s) 112. The client application(s) 112 can provide functionality to present information to a user 106 and communicate via the network 104 to exchange information with the social messaging system 130. Further, in some examples, the client devices 110 execute functionality of the image capture system 160 to segment images of video streams during capture of the video streams and transmit the video streams (e.g., with image data modified based on the segmented images of the video stream).

Each of the client devices 110 can comprise a computing device that includes at least a display and communication capabilities with the network 104 to access the social messaging system 130, other client devices, and third-party servers 120. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface components 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the image capture system 160 capable of identifying user intent for identifying and selection of modifiers for modification of a video stream. The image capture system 160 may additionally identify, track, and modify video data during capture of the video data by the client device 110. Similarly, the client device 110 includes a portion of the image capture system 160, as described above. In other examples, client device 110 may include the entirety of image capture system 160. In instances where the client device 110 includes a portion of (or all of) the image capture system 160, the client device 110 can work alone or in cooperation with the social messaging system 130 to provide the functionality of the image capture system 160 described herein.

In some embodiments, the social messaging system 130 may be an ephemeral message system that enables ephemeral communications where content (e.g. video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the image capture system 160 may identify, track, and modify an object of interest, such as pixels representing skin on a face, augmented reality objects suspended in air, designs or patterns superimposed on an object, or any other suitable modification to objects depicted in the video clip. The device may modify objects of interest during capture of the video clip without image processing after capture of the video clip as a part of a generation of content for an ephemeral message.

Figure 2:
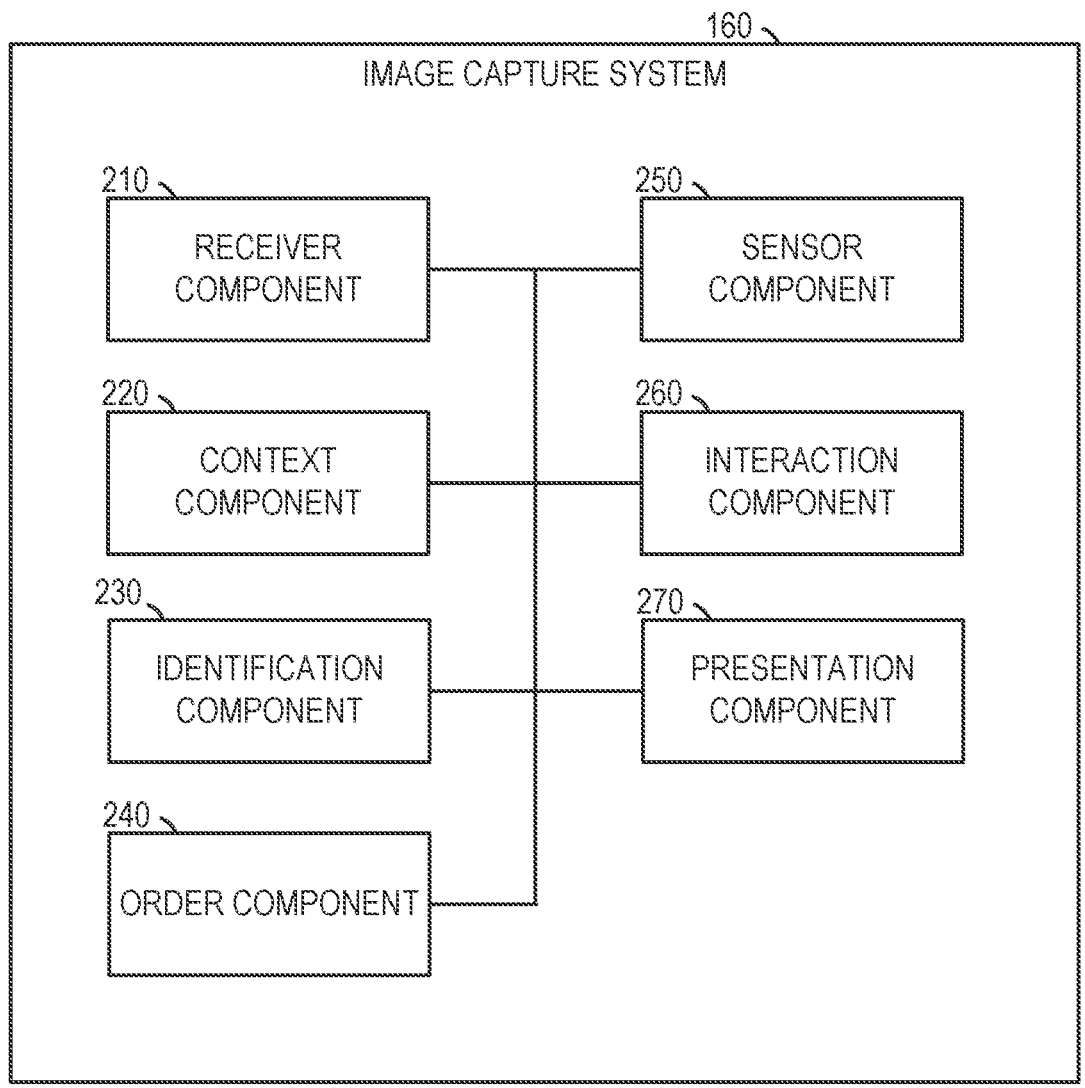
FIG. 2 is a diagram illustrating an image capture system, according to some example embodiments.

In FIG. 2, in various embodiments, the image capture system 160 can be implemented as a standalone system or implemented in conjunction with the client device 110, and is not necessarily included in the social messaging system 130. The image capture system 160 is shown to include a receiver component 210, a context component 220, an identification component 230, an order component 240, a sensor component 250, an interaction component 260, and a presentation component 270. All, or some, of the components 210-270, communicate with each other, for example, via a network coupling, shared memory, and the like. Each component of components 210-270 can be implemented as a single component, combined into other components, or further subdivided into multiple components. Other components not pertinent to example embodiments can also be included, but are not shown.

Figure 3:
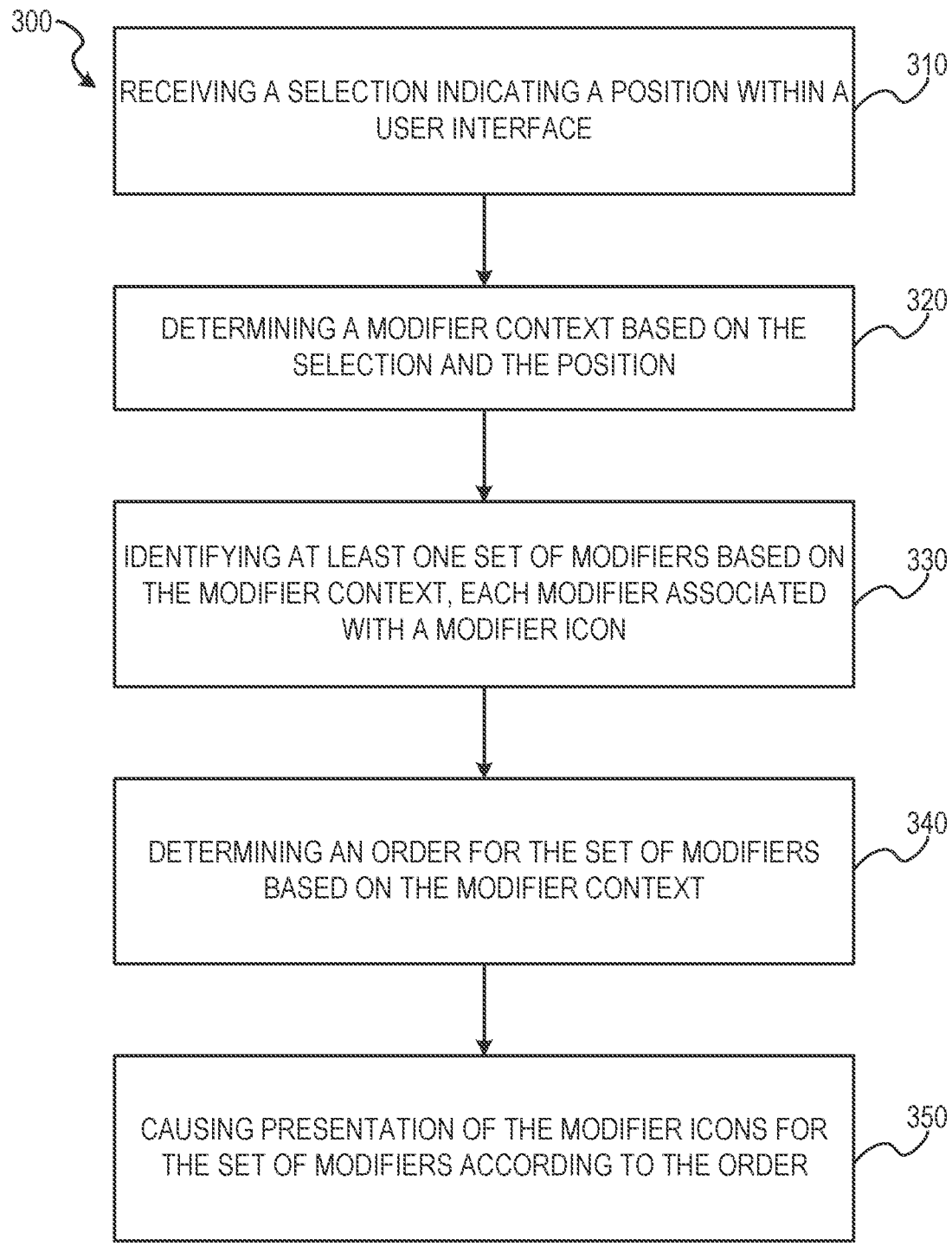
FIG. 3 is a flow diagram illustrating an example method for identifying and ordering a set of image modifiers, according to some example embodiments.

FIG. 3 depicts a flow diagram illustrating an example method 300 for determining a modifier context and providing an ordered set of modifiers within a user interface. In some embodiments, modifier context is determined along with determining a user intent from various characteristics of a selection, a field of view of an image capture device, and attributes, characteristics, or physical parameters associated with a computing device. The image capture system 160 may use information gathered from user interactions with a computing device, information sensed or received by the computing device independent of user interaction, aspects or depictions within a field of view presented at the computing device, and any other suitable information in attempt to determine an intended use of the image capture device, the user interface, and modifiers presented to the user of the computing device. In these embodiments, the image capture system 160 attempts to surface and order appropriate modifiers for a user's intended purpose. The operations of method 300 may be performed by components of the image capture system 160, and are so described for purposes of illustration.

In operation 310, the receiver component 210 receives a selection at a user interface of a computing device. The selection indicates a position within the user interface. The user interface comprises a field of view of an image capture device in communication with the computing device. The selection may indicate a region of the user interface outside of the field of view of the image capture device. In some instances, the selection at the user interface may indicate a region, area, or portion of the field of view of the image capture device. In some embodiments, the selection indicates an object of interest (e.g., a person's face) depicted within the field of view of the image capture device. The position of the selection may correspond to an object of interest, element, visual feature, physical object, aspect of scenery, or ambient aspect in the real world which is depicted within the image, video stream, or real-time field of view of the image capture device presented within the user interface displayed on the computing device.

In some embodiments, the user interface additionally comprises a set of user interface elements. The set of interface elements may include a set of icons, buttons, logos, or other graphical representations associated with discrete user functions. For example, the user interface may include user interface elements including a flash indicator, a home icon, a camera selection icon, an image capture icon, a history icon, a chat icon, a story icon, and any other suitable icon or graphical representation. The user interface elements are selectable to cause one or more of the image capture device and the computing device to perform one or more functions. For example, the flash indicator may be selectable to enable a flash discharge proximate to capturing an image or precluding a flash discharge. The home icon may be selectable to cause the computing device to display a menu, account aspects, or any other suitable combination of user interface display and user interface elements (e.g., selectable icons).

Figure 4:
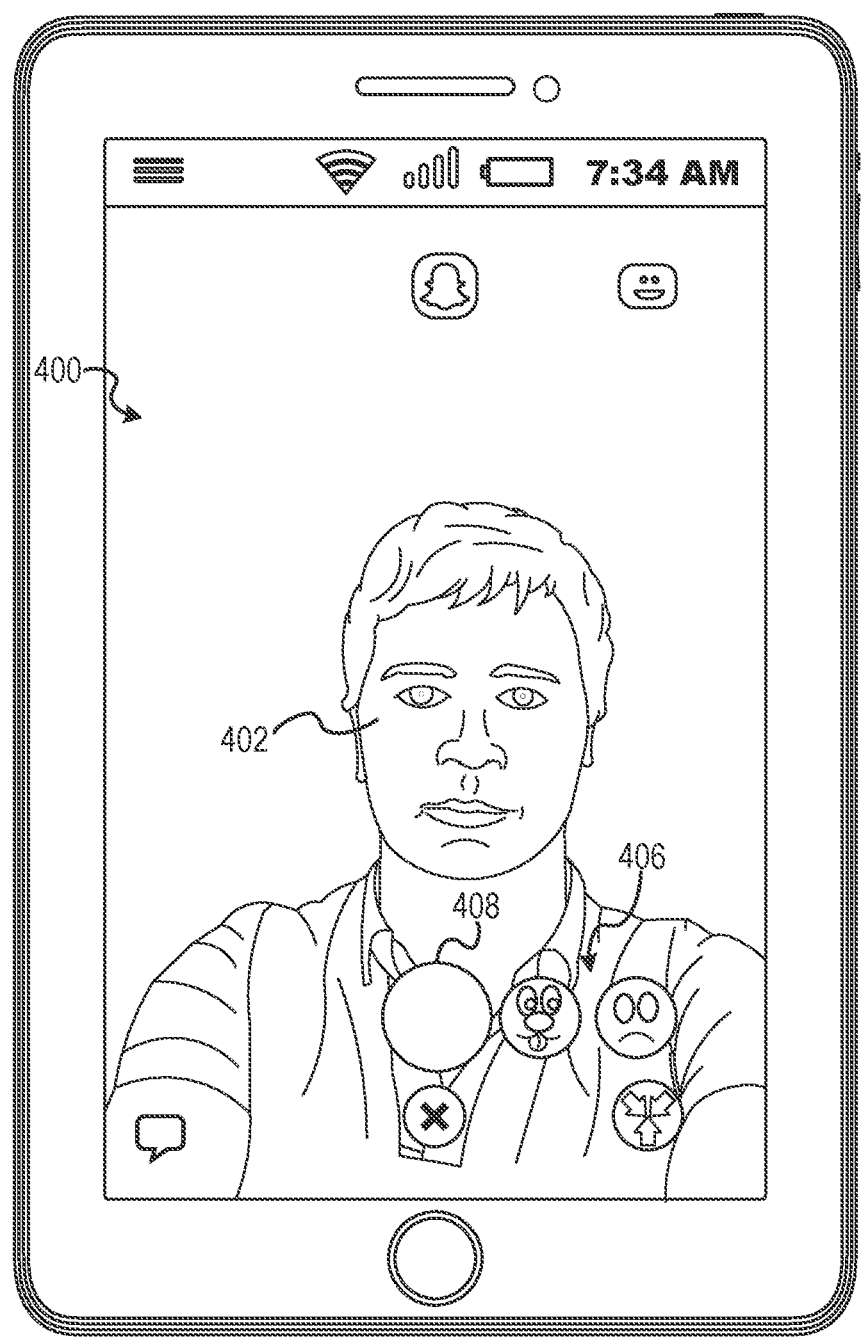
FIG. 4 is a user interface diagram depicting the image capture system in operation, according to some example embodiments.
Figure 5:
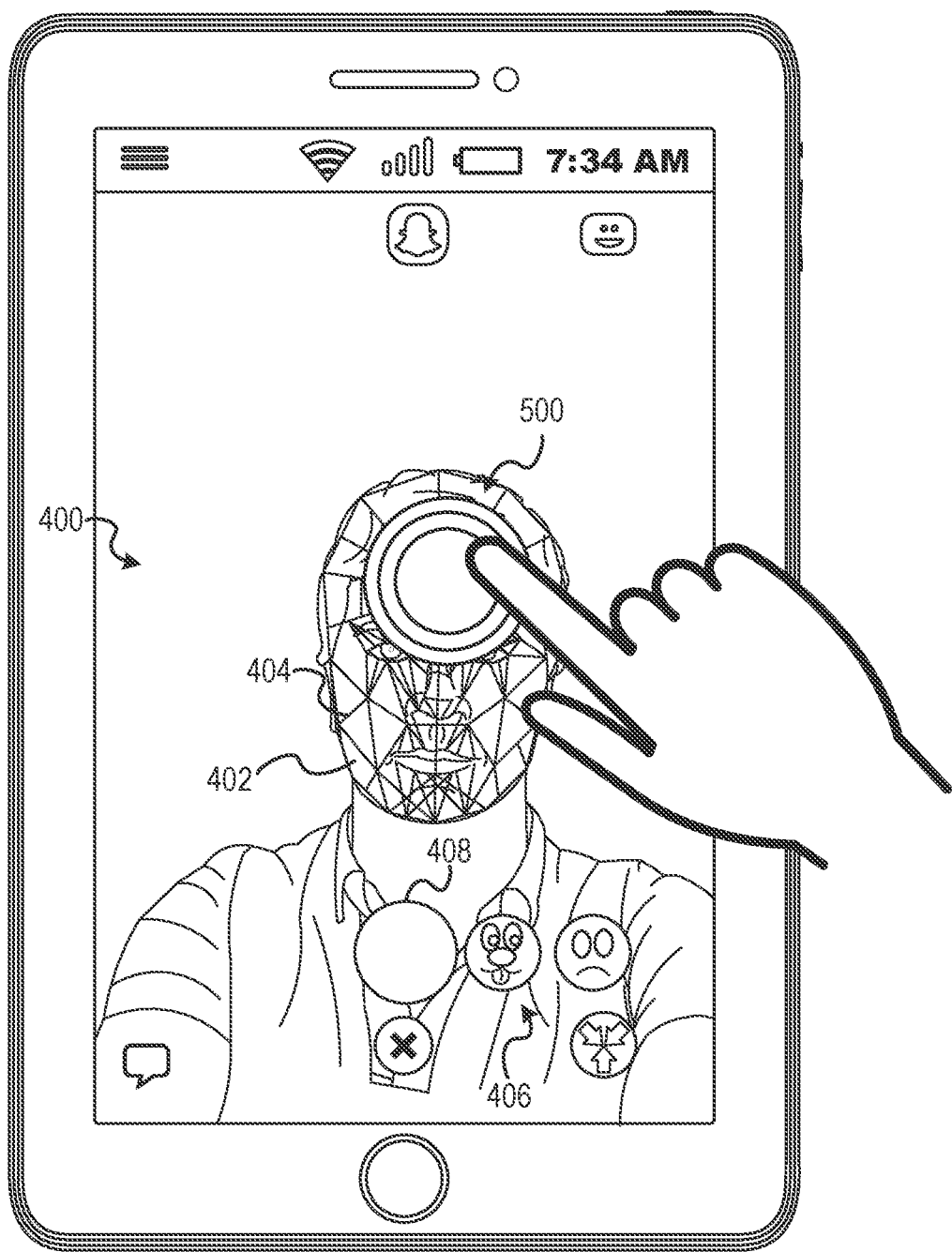
FIG. 5 is a user interface diagram depicting the image capture system in operation, according to some example embodiments.
Figure 6:
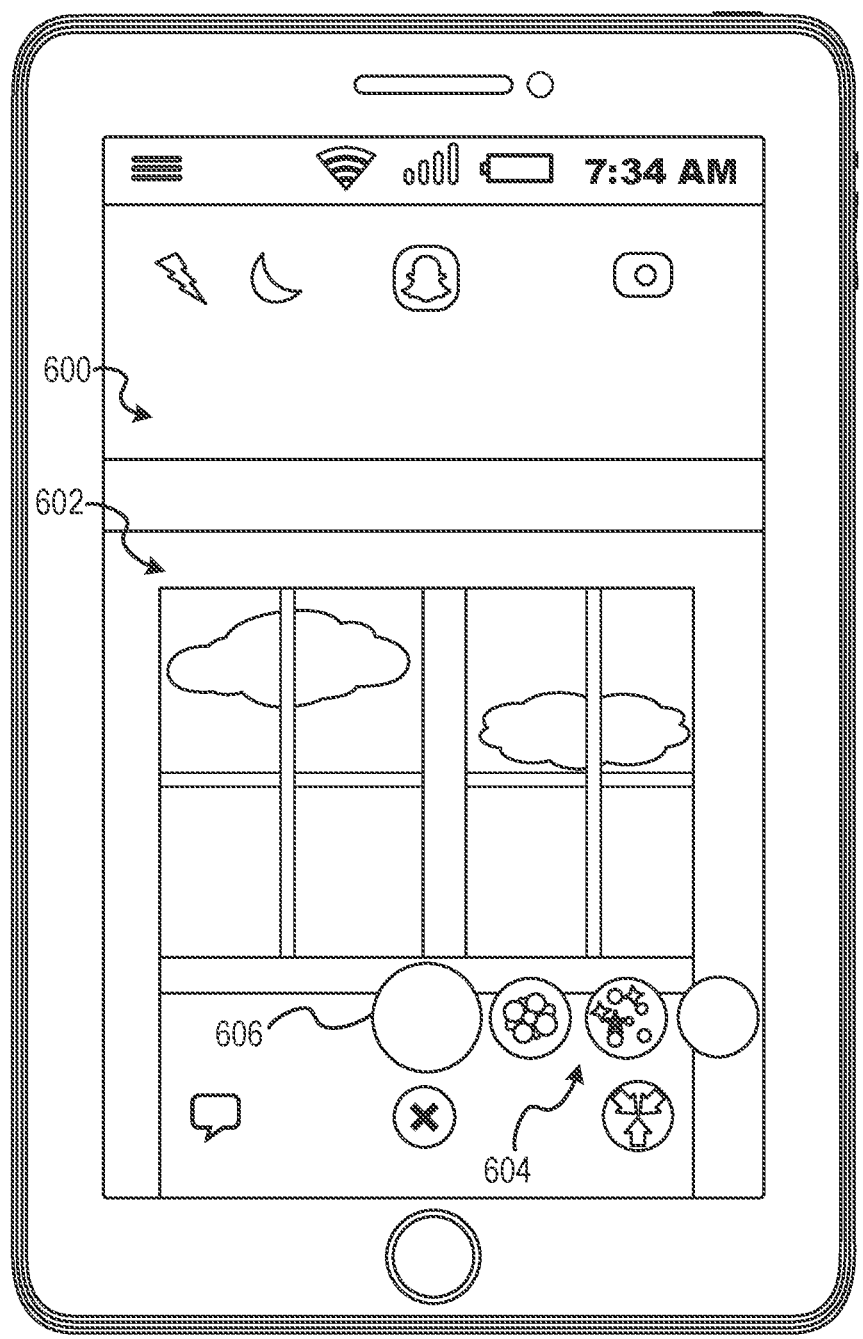
FIG. 6 is a user interface diagram depicting the image capture system in operation, according to some example embodiments.
Figure 7:
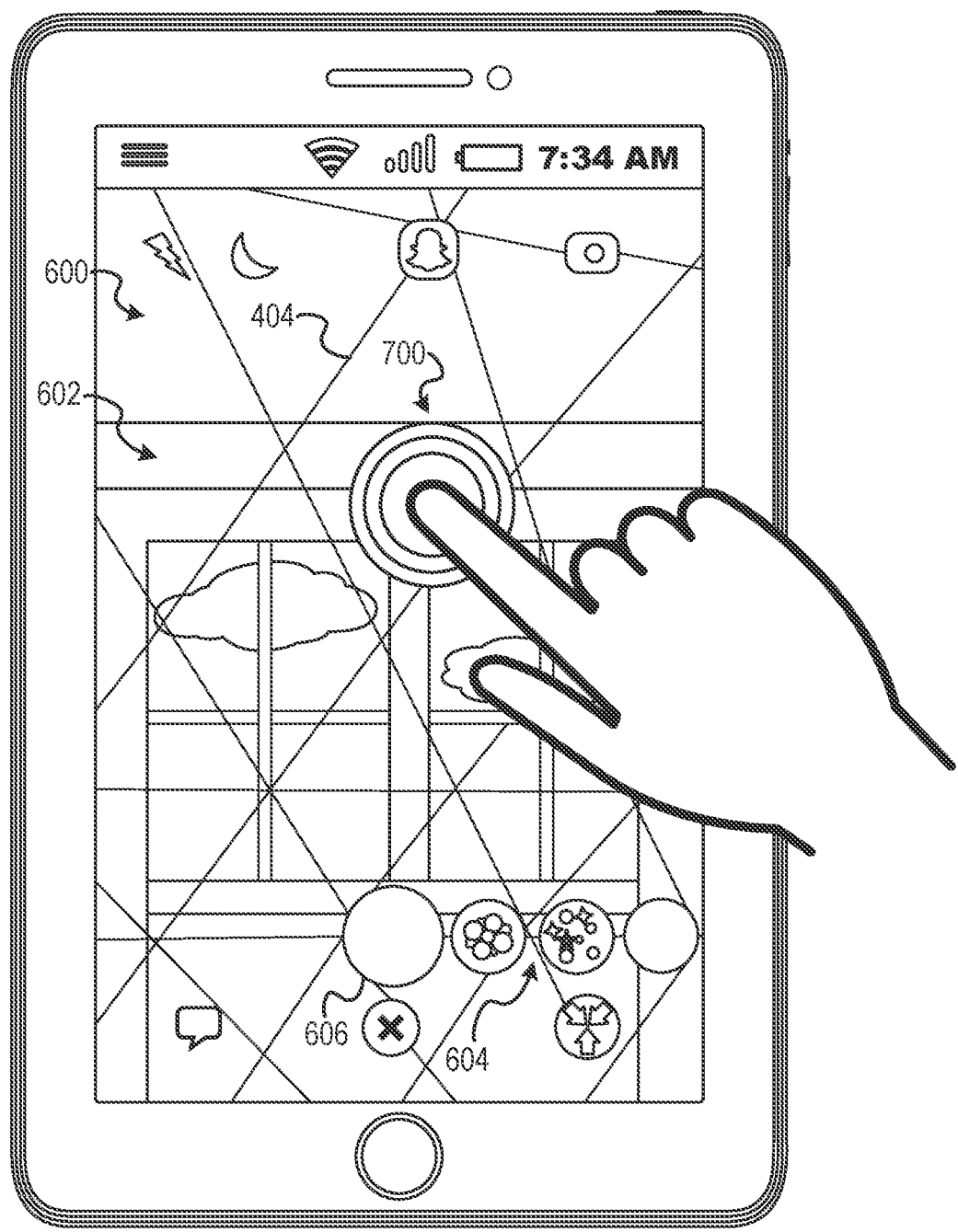
FIG. 7 is a user interface diagram depicting the image capture system in operation, according to some example embodiments.
Figure 8:
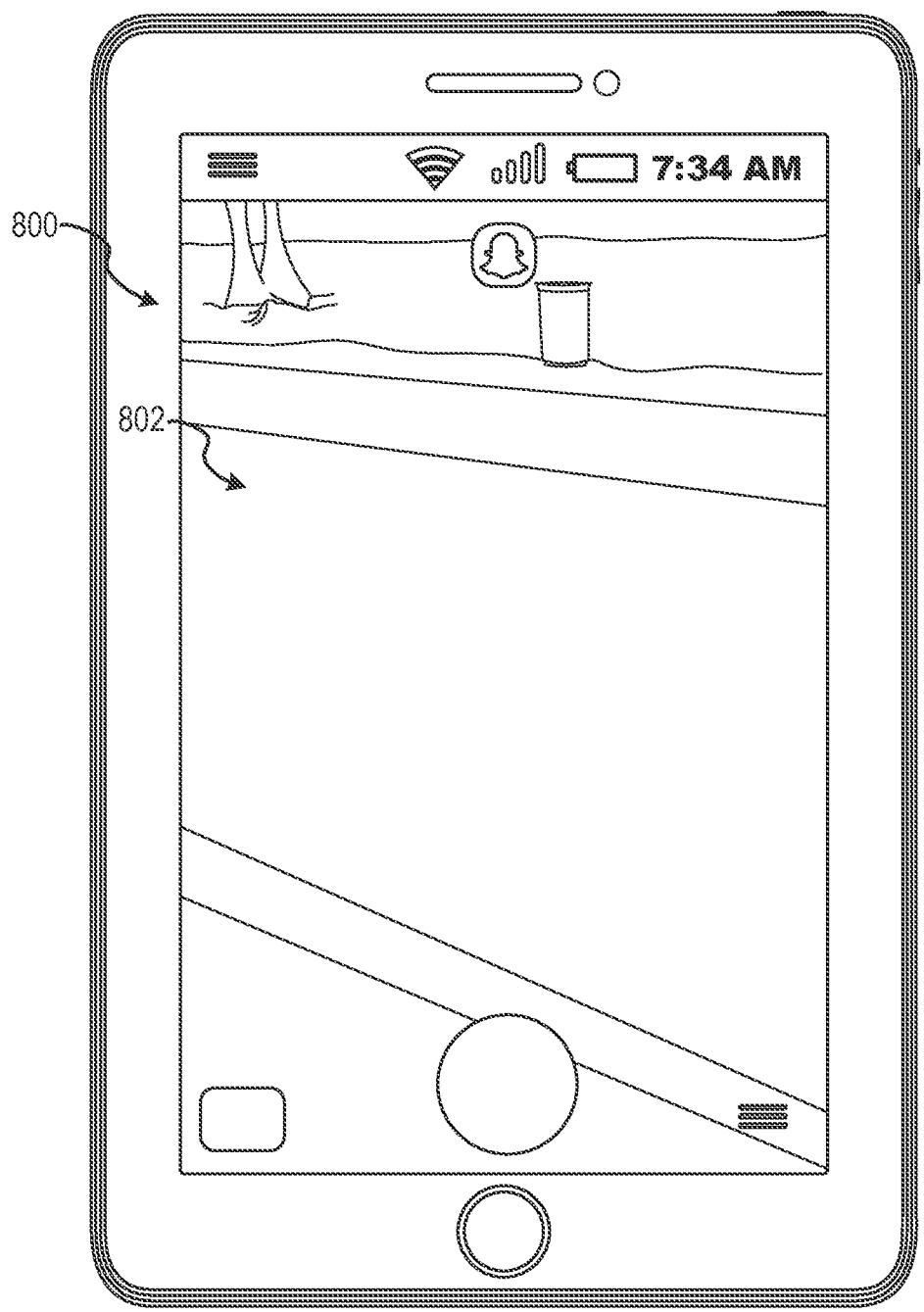
FIG. 8 is a user interface diagram depicting the image capture system in operation, according to some example embodiments.
Figure 9:
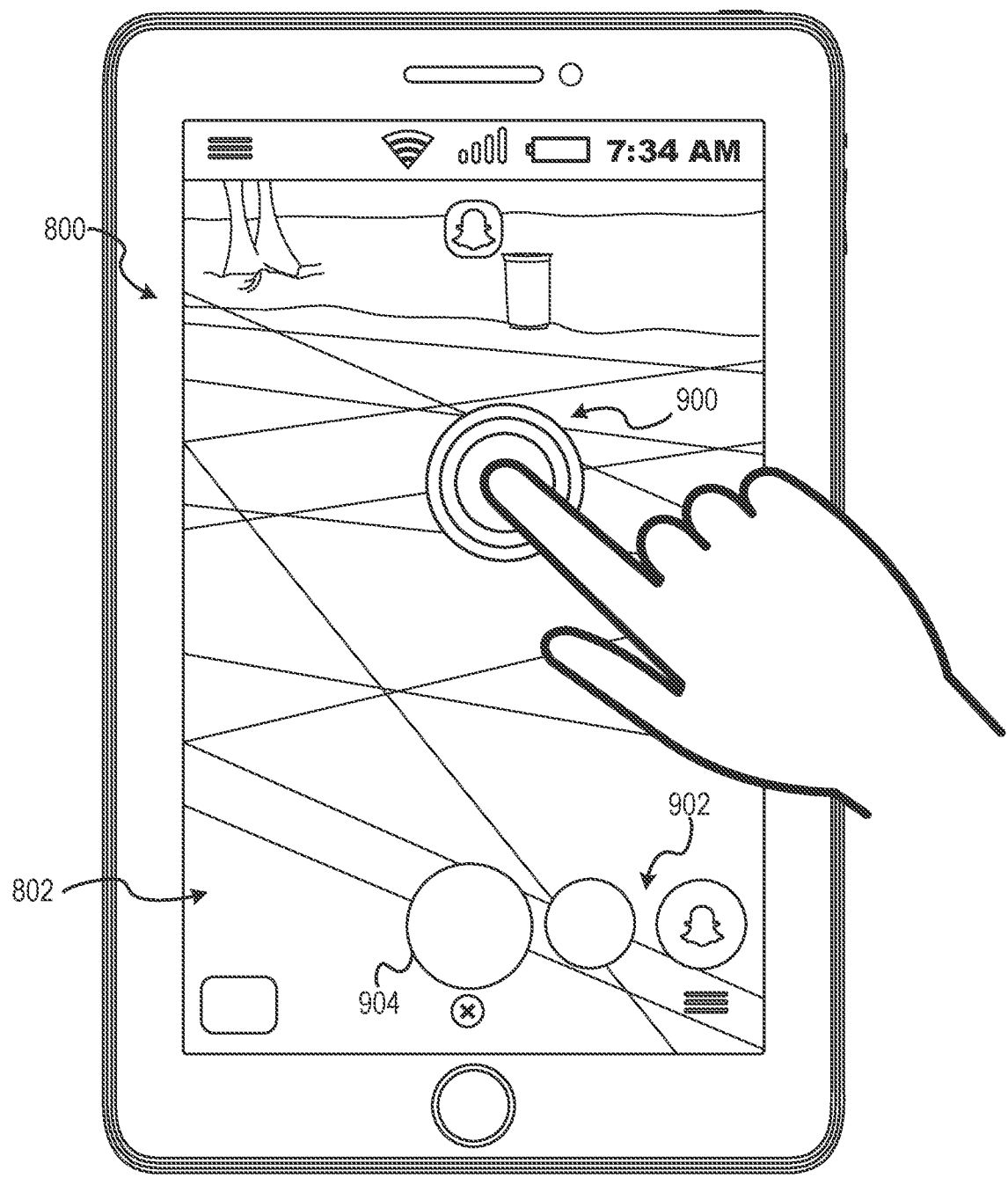
FIG. 9 is a user interface diagram depicting the image capture system in operation, according to some example embodiments.

In some instances, as shown in FIGS. 4-9, the selection, received in operation 310, indicates a position within the field of view of the image capture device depicted within the user interface. As shown in FIG. 4, an image 400, video stream, or real-time field of view of an image capture device is initially presented. In FIG. 4, a face 402 is depicted within the image 400, video stream, or real-time field of view of the image capture device. At some stages of operation, the graphical user interface includes the real-time field of view may depict a mesh 404 overlayed onto an object of interest, modifier icons 406 associated with modifying or filtering effects applicable to at least a portion of the field of view, and an image capture element selectable to initiate image or video capture operations. In FIG. 5, the selection 500 is of the face 402, where the selection 500 taps or otherwise indicates a portion of pixels depicting the face within the user interface displayed on a mobile computing device. As shown in FIG. 6, an image 600, video stream, or real-time field of view of an image capture device is initially presented depicting a portion of ambient scenery 602 (e.g., air, atmosphere, or a portion of scenery at or above eye level of a user). In some stages of operation, the graphical user interface depicting the real-time field of view may include one or more modifier icons 604 associated with modifying or filtering effects which are, upon selection, applicable to at least a portion of the field of view, and an image capture element 606 selectable to initiate image or video capture operations. In FIG. 7, the selection 700 is of the ambient scenery 602. As shown in FIG. 8, an image 800, video stream, or real-time field of view of an image capture device is initially presented depicting a portion of a ground 802. In FIG. 9, the selection 900 is of the ground 802 depicted within the field of view, indicated by selection 900, tapping, or other indication of a portion of pixels depicting the ground 802 within the user interface displayed on the mobile computing device (e.g., the client device 110). At some stages of operation, after receiving selection 900, the graphical user interface depicting the ground 802 may depict one or more modifier icons 902 and an image capture element 904. In these embodiments, the image capture system 160 generates a mesh 404 for the selected object of interest, as shown in FIGS. 5, 7, and 9, displaying the mesh 404 as an overlay on the object of interest. Although described with respect to a mesh 404, it should be understood that the image capture system 160 may identify, highlight, or indicate the object of interest by any suitable method, such as an outline; a glowing outline; a highlighted area; a collection of glowing particles or sprites proximate to, overlapping, or overlaying the object of interest or other detectable visual features; a group of graphical elements (e.g., emojis or stickers); or any other suitable indication that signifies a surface, object or other visual feature is active or may become active.

In these instances, components of the image capture system 160 may identify the selection is within the field of view of the image capture device and make one or more determinations based on the location of the selection within the field of view. The determinations may include characteristics of one or more objects depicted within the field of view, an identification of an object or person depicted within the field of view, a type of object depicted within the field of view, a scenery type depicted within the field of view, a weather event, a logo, or any other suitable information relating to objects, entities, or aspects within the field of view. Examples and embodiments of such determinations are described in more details below, however, the described determinations are not exhaustive and other suitable or similar determinations may be made by the image capture system 160.

Figure 10:
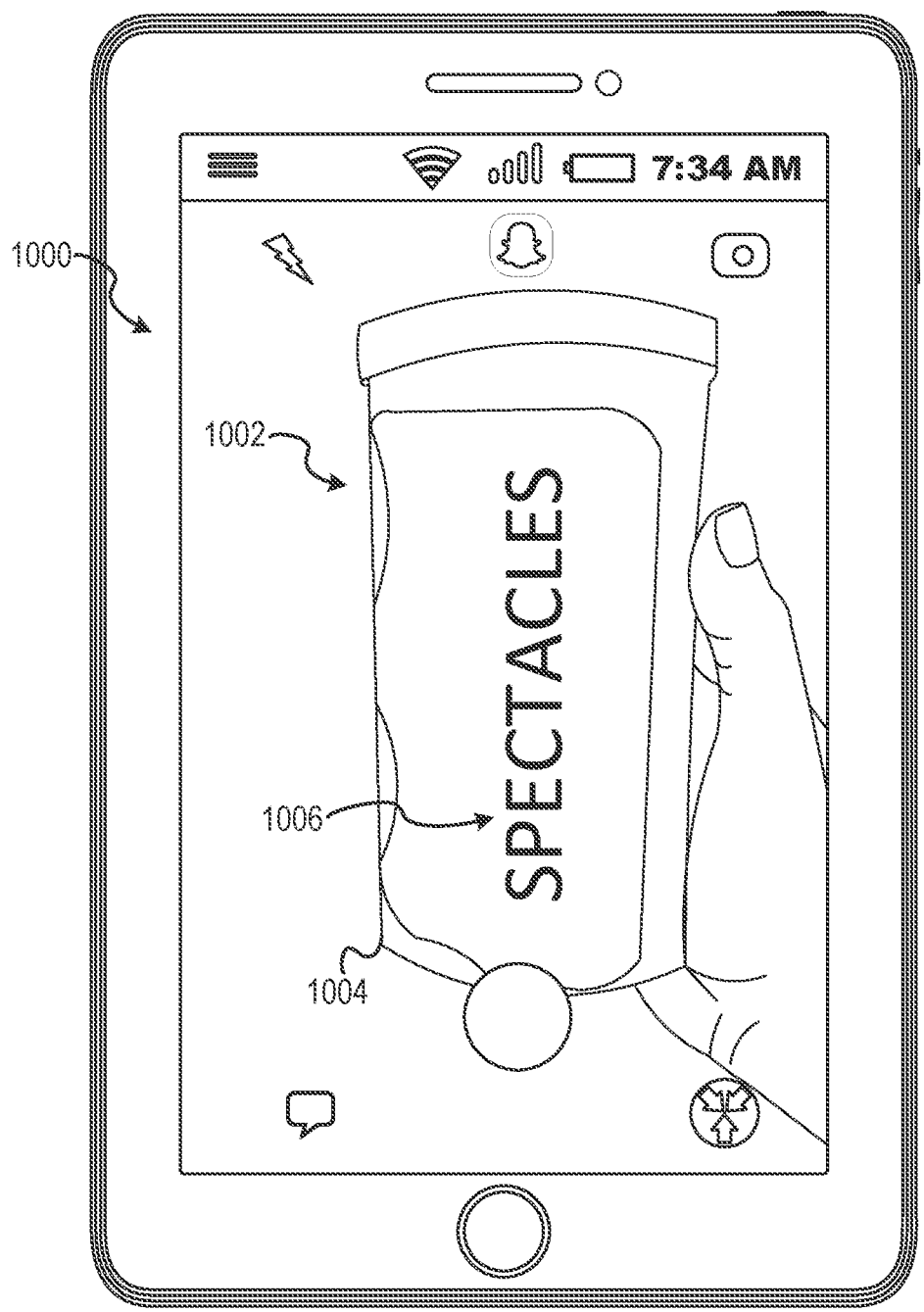
FIG. 10 is a user interface diagram depicting the image capture system in operation, according to some example embodiments.
Figure 11:
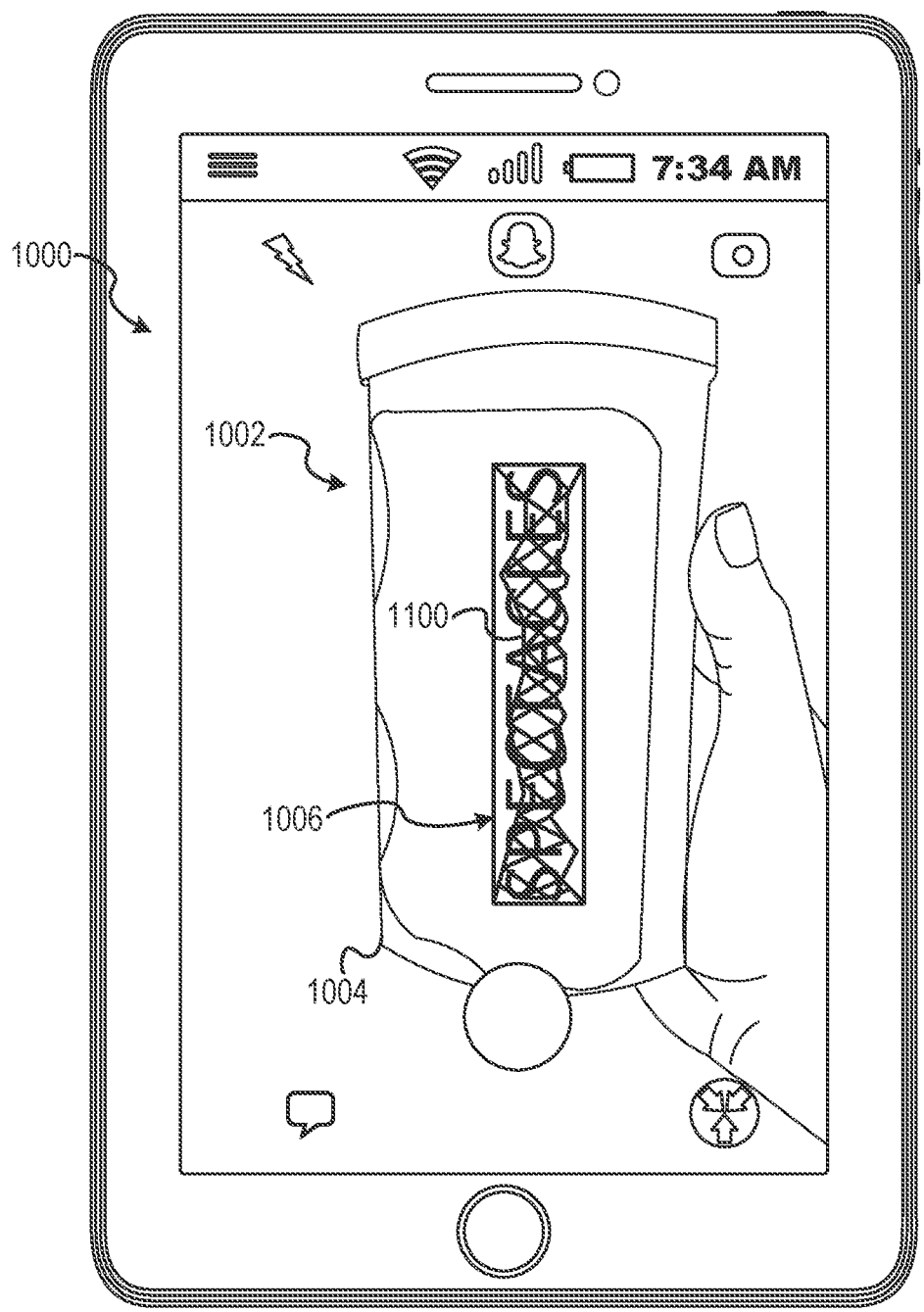
FIG. 11 is a user interface diagram depicting the image capture system in operation, according to some example embodiments.
Figure 12:
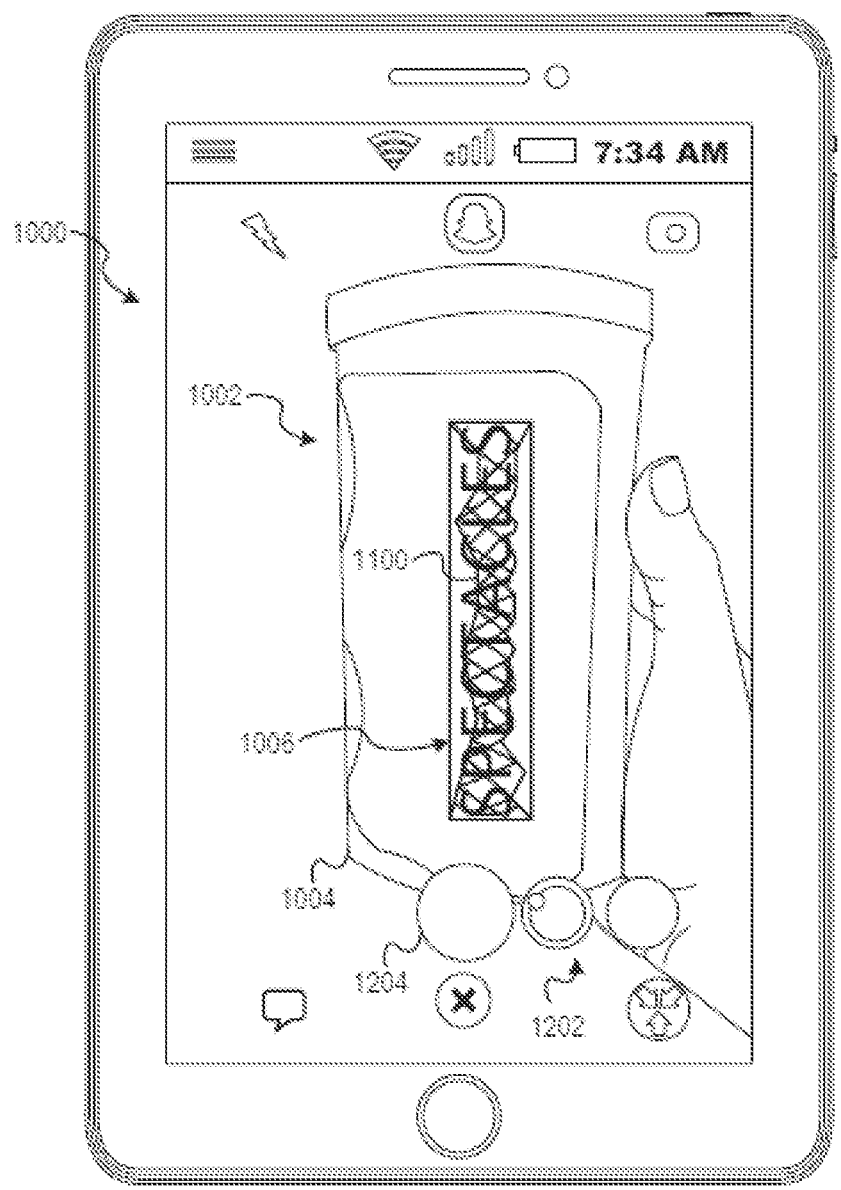
FIG. 12 is a user interface diagram depicting the image capture system in operation, according to some example embodiments.

Although described with respect to selection of an object of interest or area of interest depicted within the user interface, it should be understood that the image capture system 160 is capable of identifying or otherwise selecting the object of interest automatically, without input from a user. As shown in FIGS. 10-12, the image capture system 160 receives, captures, or causes presentation of an image 1000, a video stream, or a real-time field of view of an image capture device including one or more potential objects of interest 1002. For example, as shown in FIG. 10, a container 1004 and a logo 1006 are presented within the real-time field of view of the image capture device. As will be described in more detail below, the image capture system 160 identifies the logo 1006 as the object of interest 1002, as shown in FIG. 11. The image capture system 160 may identify the logo 1006 based on existence of an associated image modifier among the modifiers available to the image capture system 160. The image capture system 160 generates the mesh 1100 overlay on the logo 1006, as shown in FIG. 11. As will be described below in more detail, in response to identifying the logo 1006 as the object of interest 1002, the image capture system 160 surfaces or identifies a set of modifiers and causes presentation of at least one modifier icon for the set of modifiers associated with the logo.

In some example embodiments, the identification component 230 performs the determinations in a set of operations initiated upon receiving the selection. The identification component 230 may determine one or more characteristics of one or more objects of interest depicted within the field of view of the image capture device. The characteristics of the object of interest may be determined by shape recognition operations, edge detection, facial recognition, edge matching, image segmentation, blob analysis, gradient matching, grayscale matching, or any other suitable object detection method.

After or contemporaneous to determining the one or more characteristics of the object of interest, the identification component 230 determines an identification for the object of interest, or each object of interest where a plurality of objects of interest are depicted within the field of view. The identification may be based on the determination of the one or more characteristics of the object of interest. In instances where the object of interest is an individual and the characteristics are determined through facial recognition operations, the identification component 230 determines the identity of the object of interest as one or more of identifying a face and identifying an individual depicted within the field of view.

In some example embodiments, in response to receiving the selection in operation 310, the presentation component 270 generates a representation graphic indicating one or more of the positions of the selection within the user interface and an object of interest identified within the field of view based on the selection. In some instances, the representation graphic includes a mesh overlaid on the object of interest. For example, where the object of interest is a face, the presentation component 270 may overlay, for a period of time, a mesh onto the face. Where the object of interest is a sky, the presentation component 270 may overlay the mesh onto at least a portion of the sky visible within the field of view of the image capture device. Further, where the object of interest is a floor, the presentation component 270 may overlay the mesh onto at least a portion of the floor. In some embodiments, the interaction component 260 uses the mesh overlay to indicate the selection of the object of interest. In other embodiments, the interaction component 260 and the presentation component 270 employ other indications of a particular object selection (e.g., a color change or image alternation associated with the particular object selection to highlight the particular object selection). In still other embodiments, the presentation component 270 generates and causes display of indicators that show which objects are selectable within a field of view.

Upon selection, each target, area selected, or pixel position may display a context-specific mesh at activation. After activation, the presentation component 270 loads at least one set of modifiers, described in more detail below. In some instances, the modifiers are presented in a formatted presentation referred to as a modifier carousel. In some instances, the mesh is displayed for a target object when the modifier carousel user interface elements appear. In some embodiments, a mesh is not displayed where the mesh would be a subsequent mesh switching from a front to a rear camera. In some instances, a subsequent mesh is not displayed when tapping a second time on a same activator target while a modifier (e.g., a lens, filter, or set of add-on graphical elements) is active. In some embodiments, selections in at least a portion of the screen causes display of a focus icon (e.g., a focus reticle) enabling selective or manual focus. In some instances, a subsequent mesh is displayed where a user selects or otherwise taps on a user interface indicating a modifier (e.g., a lens, filter, or set of add-on graphical elements) having a modifier category or class different than the category associated with an activation and presentation of a previous mesh. For example, if an atmospheric modifier is active and a selection of a face is received, the mesh (e.g., the subsequent mesh) is presented as an overlay of the face. By way of further example, FIGS. 5, 7, 9, and 11-12 show generation and presentation of a mesh overlaid on the face selected in FIG. 5, the ambient scenery selected in FIG. 7, the ground selected in FIG. 8, and the logo identified in FIG. 10, respectively. FIGS. 4-7, 9, and 12 also show initial presentation of the modifier carousel. In some embodiments, the operations used to identify modifier (e.g., lenses, filters, or sets of add-on graphical elements) and populate the modifier carousel are performed prior to display of the modifier carousel and may be performed prior to display of the mesh.

In some instances, selection causes or triggers the presentation component 270 to cause presentation of the mesh or other indicator, as an animated overlay above an identified target, and presentation of a focus animation. The focus animation may be representative of a focusing operation of the image capture device which causes the image capture device to focus on a target or target region indicated by the selection.

In some example embodiments, the modifier carousel includes search functionality to enable a user to identify or select a specified or desired modifier. In some instances, the search functionality is enabled using a search icon placed within the modifier carousel and among the modifier icons. The search icon depicts an indication of search functionality, such as a question mark or other graphical representation of search functionality. In some instances, the search icon is positioned within the modifier carousel according to an order specified for the modifier icons, described in more detail below. The search icon is presented at the end of the set of modifier icons included in the modifier carousel and presented according to a specified order. In some instances, the search icon is positioned at the front or beginning of the ordered set of modifier icons.

In example embodiments, the search icon is presented outside of the modifier carousel. For example, in some instances, the modifier carousel is presented on a right-hand side of an image capture element and, once selected, a modifier icon is positioned inside the image capture element. In such instances, the search icon may be presented on a left-hand side of the image capture element. In some example embodiments, the search icon is presented proximate to the image capture element. In some instances, the search icon is presented a distance apart from the image capture element, such that at least one modifier icon occurring before a selected modifier icon in the ordered set of icons is presented proximate to the image capture element on a side of the image capture element opposite the modifier icons occurring after the selected modifier icon in the ordered set of modifier icons. In some instances, the search icon is presented in a plane apart from the modifier icons presented in the modifier carousel. For example, the search icon may be presented above or below the image capture element, when the modifier icons of the modifier carousel are presented in a horizontal line of a plane including the image capture element.

Referring again to FIG. 3, in operation 320, in response to receiving the selection at the user interface, the context component 220 determines a modifier context, based at least in part on the selection and the position within the user interface. In some instances, the modifier context may be understood as a determination of an intent of the user based on a target of the selection. Where multiple targets may be indicated by the selection, the context component 220 may determine the modifier context by one or more characteristics of the selection. The characteristics of the selection may be aspects of the selection itself. In some instances, the characteristics of the selection are information determined at the time of the selection. The characteristics may also be information associated with the computing device or the image capture device captured, determined, or sensed contemporaneous to receiving the selection.

As described below in more detail, where the target of the selection is clear (e.g., a selection proximate to a potential object of interest), the identification component 230 identifies a modifier category (e.g., a filter category, a lens category, or a category for a set of add-on graphical elements) or an activator type for the target. For example, where the selection indicates a face, components of the image capture system 160 may identify "face" as the modifier category or activator type. Activator types may include a code entered for a specified modifier, a natural feature tracking (NFT), a face, a surface, air, or any other suitable activator type. In some embodiments, to determine user intent, components of the image capture system first use the modifier category matching the target, and then use other rules, characteristics or categories, in a descending order.

In some instances, to determine the modifier context, the context component 220 performs one or more sub-operations. In some embodiments, components of the image capture system 160 identify one or more context indicators. The context indicators may be understood as signals, aspects, attributes, or characteristics surrounding the initial selection which provide information about that selection. In some embodiments, the context indicator may relate to a context of the client device 110. The context of the client device 110 may indicate a location or use of the client device 110 at the time of selection. In some instances, these device related context indicators may comprise any one or more of a geolocation of the computing device (e.g., the client device 110); a time of day; a set of weather data; or any other suitable information relating to a time, place, or other context of using the client device 110. The context indicators may relate to a type of usage of the client device 110. In some embodiments, usage type context indicators may comprise a face depicted within the field of view; a plurality of faces depicted within the field of view; a specified person of a set of predetermined people depicted within the field of view; a natural feature tracking identification; a representative symbol identifying an entity, an event, or a product; a sponsorship; an orientation of the computing device; a movement of the computing device; an object type depicted within the field of view; an unlock code applied to a specified modifier; an image capture device position relative to the computing device; a modifier popularity score; and combinations thereof. The context indicators may also comprise combinations of the client device 110 context and use contexts.

After determining the context indicators, the context component 220 determines the modifier context based on one or more of the selection, the positions of the selection, and the one or more context indicators. As discussed above, the context indicator may be user interface information, device information, or other information indicating a suggested context of modifier usage. The context component 220 may use the selection, the position of the selection, and the context indicators to determine the modifier context by identifying keywords associated with each of the selection, the position, and the context indicators and compare the keywords with a set of keywords associated with a set of modifier contexts. The modifier contexts may be a set of categories assigned to filters or other modifiers to be applied to the image, video stream, or real-time field of view captured by the image capture device and presented on a display of the client device 110.

In embodiments where components of the image capture system 160 determine and identify objects of interest within the field of view, the context component 220 determines the modifier context based on the selection (e.g., the selection received in operation 310), the position of the selection within the user interface, and the identification of the object of interest. Where the context component 220 determines and identifies a plurality of objects of interest, the context component 220 determines the modifier context based on the selection, the position of the selection, and the identifications of at least one of the plurality of objects of interest. For example, the context component 220 may determine the modifier context as a modifier context applicable to all of the plurality of objects of interest or a portion thereof. The context component 220 may select a modifier context for faces, where the plurality of objects of interest are people or faces depicted within the field of view of the image capture device. Where differing types of objects of interest are identified, the context component 220 may select a modifier context associated with a majority of the plurality of objects of interest. The context component 220 may also select a modifier context associated with a theme or attribute common to multiple different types of objects of interest included in the plurality of objects of interest.

In operation 330, the identification component 230 identifies at least one set of modifiers based on the modifier context. In some embodiments, a modifier is an image filter, a digital lens, a set of add-on graphical elements, or any other suitable visual effect or modification which may be applied to at least a portion of an image, video stream, or real time or live field of view of an image capture device. The image, video stream, or field of view of the image capture device is presented within the user interface presented by the image capture system 160. In some embodiments, after selection of a modifier of the at least one set of modifiers, as will be described in more detail below, the image, video stream, or field of view of the image capture device may be modified to include the modifier or a visual or audio effect of the modifier within the image, video stream, or field of view prior to or while the image, video stream, or field of view is being presented and captured. The set of modifiers comprises one or more modifiers for the image capture device and a modifier icon for each modifier of the set of modifiers. Tables 1 and 2 show an example of modifier types available for selection. Each modifier type or set of modifiers may comprise a plurality of distinct modifiers. Tables 1 and 2 also provide category information (e.g., lens mode, lens type, content) and context indicators (e.g., camera type, activation type, launch type, initialization type, and camera swap).

TABLE 1

| Front Camera | | | | | |
|---|---|---|---|---|---|
| Lens Mode | NFT | Sponsored | Code | Face+ | Face |
| Lens Type | Experience registered to object | Sponsored | Code | Face + Air | Face |
| Camera Content | Rear Laguna, Billboard | Front/Rear Any lens could be sponsored | Rear TBC | Front/Rear Character POV | Rear Become character |
| Activation | Tap Marker | Tap Face, Air | Tap code | Tap Face/Air | Tap Face |
| Launch | Loads on Rear Camera | Loads on Active Camera | Loads on Rear Camera | Loads on Active Camera | Loads on Active Camera |
| Initialization | Target Mesh (NFT target) | Face Mesh/Air Mesh | Interstitial card | Face Mesh/Air Mesh | Face Mesh |
| Camera Swap | Air Active | Face Active | Rear Only | Face/ Face + Air Active | Face Active |

TABLE 2

| Front Camera Lens Mode | ⊙ Air | ⊖ Air | ⊛ Air | ⓢ Surface |
|---|---|---|---|---|
| Lens Type | Environment | Sound | Sky | Experience Registered to surface |
| Camera Content | Front/Rear Themed environment | Front/Rear Sound reactive visuals | Front/Rear Ghost in sky | Rear 3D text, paint, games, etc. |
| Activation Launch | Tap Air Loads on Active Camera | Tap Air Loads on Active Camera | Tap Air Loads on Active Camera | Tap Air Loads on Rear Camera |
| Initialization Camera Swap | Air Mesh Air Active | Air Mesh Air Active | Air Mesh Air Active | Surface Mesh TBC |

In some instances, the identification component 230 identifies the set of modifiers (e.g., a single set of modifiers or a plurality of sets of modifiers) by comparing or matching the modifier context (e.g., an identified lens, modifier, or filter category or activator type) to a modifier category associated with one or more modifiers in the set of modifiers. In some instances, the identification component 230 identifies the set of modifiers as a set of modifiers having a common modifier category or a set of related modifier categories. In some embodiments, the identification component 230 identifies the set of modifiers individually, composing the set of modifiers based on individually identifying one or more modifiers based on the modifier context.

In some embodiments, each modifier is associated with at least one modifier category. Filter or modifier categories may be modifier contexts or may be a category label associated with at least one modifier context. In some instances, modifier categories are descriptive identifiers common to modifiers included within a specified set. For example, modifier categories may include face modifiers, atmospheric modifiers, ground modifiers, face swapping modifiers, emotion modifiers, costume modifiers, or any other suitable categorical organization and description of a modifier. Where new modifiers are added to the image capture system 160 for incorporation into a set of modifiers, the modifier is received by the receiver component 210. The modifier is associated with at least one modifier category indicating at least one context indicator triggering identification of the modifier. The at least one context indicator may be one or more of an object of interest and sensor data. In some instances, the context indicator may be the modifier context. In embodiments where the context indicator is not the modifier context, the context indicator may be used, at least in part, to determine or derive the modifier context.

In some embodiments, modifier categories for a specified modifier may include a first modifier category and a second modifier category. The first modifier category indicates a primary context indicator associated with the modifier. The second modifier category indicates a secondary context indicator associated with the modifier. The modifier may be identified and displayed upon detection of one or more of the first modifier category and the second modifier category.

In operation 340, in response to identifying the set of modifiers (e.g., a single set of modifiers or a plurality of sets of modifiers), the order component 240 determines an order for the set of modifiers based on the modifier context. In some embodiments, modifiers (e.g., filters, lenses, or a set of add-on graphical elements) have a primary modifier category and one or more secondary modifier categories. The primary modifier category is the modifier category of the modifier. The one or more secondary modifier category indicates modifier categories with which the modifier may be compatible. The primary modifier category may be related to the secondary modifier categories, such that the primary modifier category indicates the one or more secondary modifier categories which are compatible with the first modifier category. In these instances, modifiers, of the set of modifiers, having a primary category which matches the modifier context are displayed first in the modifier carousel. For example, with modifier categories including selfie, air, ground, logo, and mural, each category may define one or more other categories compatible with the specified category. Further, the interrelation of categories may be used to surface the order of modifier s. As shown in Table 3, individual categories may include an ordered list of secondary categories used to generate the order.

TABLE 3

{
   Logo: [Air, Ground, Selfie],
   Mural: [Air, Ground, Selfie],
   Air: [Ground, Selfie],
   Ground: [Air, Selfie],
   Selfie: [Ground, Air]
}

As shown in the example of Table 3, when a selection indicates a modifier context of a face (e.g., a modifier category of Selfie), the identification component 230 or the order component 240 may select modifiers associated with categories of selfie, ground, and air. After selection of the modifiers, the order component 240 may generate an order for modifiers of the set of modifiers such that modifiers associated with a primary modifier category of selfie are placed first and modifiers having a primary modifier category of ground or air may be placed later. Further, modifiers included in the order which are associated with the ordered list of secondary categories (e.g., shown in Table 3) may be subject to inclusion based on public availability in a geographic area.

In some instances, the secondary categories and their respective orders, as shown in Table 3, may be modified for each modifier category, as shown in Table 4.

TABLE 4

| 1 | User Action/Intent | Lens Category (Group 1) | Group 2 | Group 3 |
|---|---|---|---|---|
| 2 | Tap on face | Selfie (SELFIE) | Air | |
| 3 | Tap on air | Air (GYRO) | Selfie | |
| 4 | Tap on marker | Laguna (NFT) | Air | Selfie |
| 5 | Unlock face lens via code | Selfie (SELFIE) | Air | |

In some embodiments, the identification and order of modifiers P included in the one or more set of modifiers uses a user intent as a primary ordering mechanism and includes additional modifiers appended to the end of the set of modifiers. For example, the intent of the user may be a primary ordering characteristic. In this example, receiving a selection of the sky in a field of view of the image capture device causes the image capture system 160 to select and order modifiers for the sky first in the modifier carousel. Filters surfaced according to the primary ordering characteristic may be primary intent modifiers $X_1$-$X_n$. The image capture system 160 appends additional modifiers to the end of the ordered list of primary intent modifiers $X_1$-$X_n$. For example, selecting a logo may cause the image capture system 160 to surface modifiers associated with the logo as well as world modifiers. World modifiers may be surfaced to increase discoverability of other modifiers in the image capture system 160 and to provide a consistent user interface experience.

In these embodiments, the set of modifiers and order of the modifiers may be determined first using an indication of user intent, surfacing and prioritizing primary intent modifiers, described above. In some instances, the primary intent modifiers may be surfaced and ordered in a manner similar to or the same as described for operations 330 and 340. The image capture system 160, in ordering the modifiers, may determine whether the set of modifiers includes a modifier associated with a specific geolocation and place the geolocation modifier in a first position. Where the set of modifiers also includes a sponsored modifier, the sponsored modifier may be placed in a second position. The remaining modifiers of the set of modifiers may be positioned in positioned occurring after the sponsored modifier. The remaining modifiers may be ordered using a ranking algorithm such as newest first, a popularity based ordering algorithm, a characteristic based ordering algorithm, or any other suitable ranking or ordering scheme. After a final modifier in the set of modifiers, the image capture system 160 may append one or more world modifiers. The world modifiers may be ordered using the same or similar rules for ordering modifiers as described above. In some instances, NFT modifiers triggered by selection on a logo or other explicitly identified mark or representation may be included in the group of appended world modifiers where the NFT modifier satisfies a geolocation element.

In operation 350, in response to identification of the set of modifiers, as a group or individually, and determining the order for the modifiers, the presentation component 270 causes presentation of the modifier icons for the set of modifiers within the user interface. The modifier icons are presented as selectable user interface elements within the user interface. In some embodiments, the modifier icons are positioned in a portion of the user interface outside of the field of view of the image capture device included within the user interface. In some instances, the modifier icons are positioned within a portion of the field of view of the image capture device. As shown in FIGS. 4-7, 9, and 12, the modifier icons may be presented proximate to an image capture element. For example, FIGS. 4 and 5 show a set of modifier icons 406 which are presented proximate to an image capture element 408 below a face determined to be the object of interest. FIGS. 6 and 7 show a set of modifier icons 604 which are presented proximate to an image capture element 606 below ambient scenery within a field of view. FIG. 9 shows a set of modifier icons 902 proximate to an image capture element 904 and the ground 802 depicted within the field of view. FIG. 12 shows a modifier icon 1202 which is presented proximate to an image capture element 1204 below a logo determined to be an object of interest in the field of view.

Figure 13:
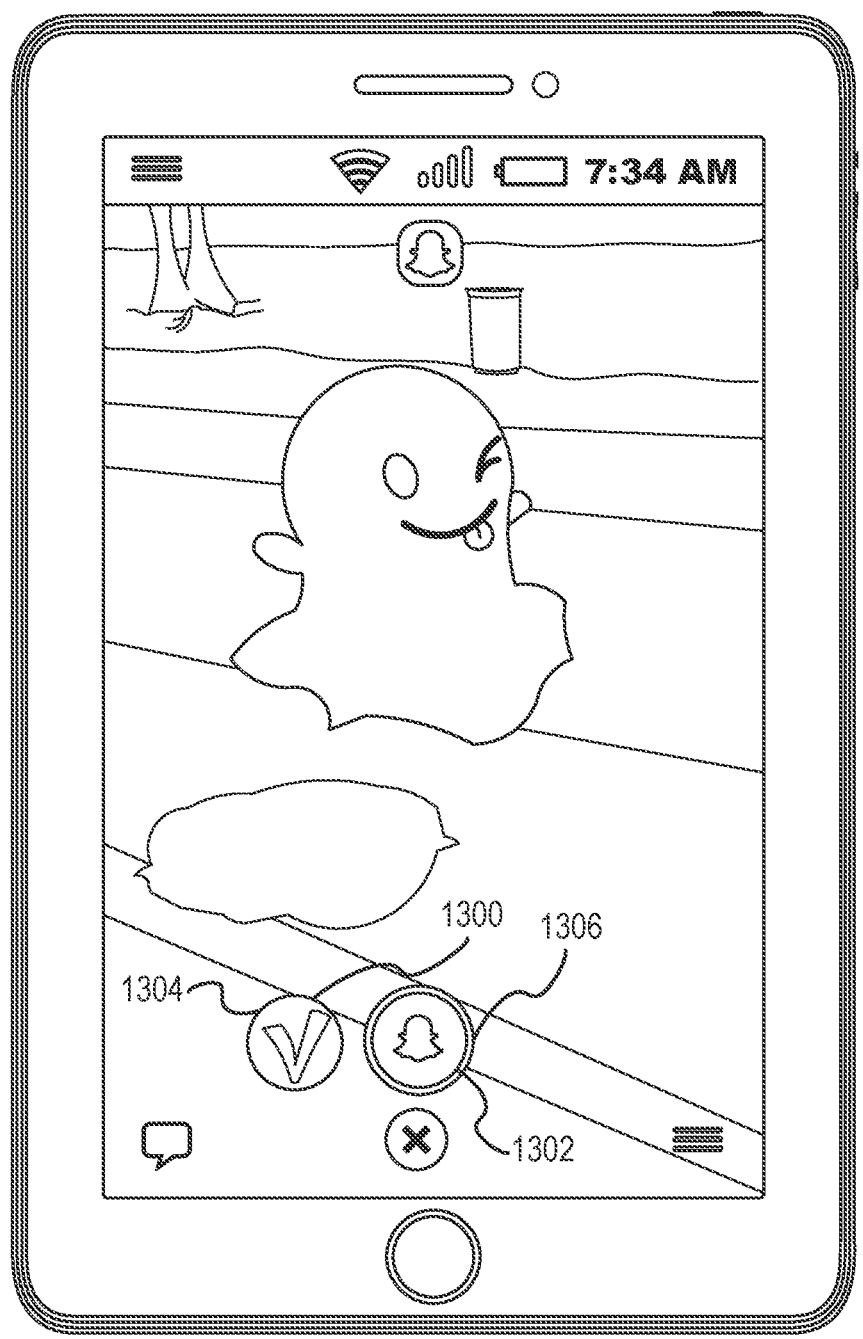
FIG. 13 is a user interface diagram depicting the image capture system in operation, according to some example embodiments.

As shown in FIG. 13, in some embodiments, selection or manipulation of a modifier icon 1300 causes the modifier icon 1300 to be displaced from a first position 1302 and moved to a second position 1304. For example, selection (e.g., tapping) of the modifier icon 1300 may move the modifier icon 1300 from a first position 1302 (positioned a distance away from the image capture element) to a second position 1304. The second position 1304 may be proximate to the image capture element 1306 or may be positioned within the image capture element 1306. In some instances, the modifier icons are sized such that the modifier icon 1300 may be positioned within an interior portion of the image capture element 1306. Although the modifier icons are shown as being aligned in a plane containing the image capture element 1306 and extending away from the image capture element 1306 in one or more directions, it should be understood that differing presentations may also be used. For example, the modifier icons may be positioned around the image capture element 1306, extending radially outward therefrom. By way of further example, the modifier icons may be presented in a movable line above or below the image capture element.

In some embodiments, modifiers or modifier icons within a modifier category group are ordered according to a set of rules. The set of rules may comprise a priority determination, a sponsorship determination, and an unlock determination. The priority determination may be determined using a priority value assigned to each modifier. For example, a sponsorship determination may assign a modifier a priority value of zero, indicating a highest priority, such that a sponsored modifier appears first in the order. The unlock determination may receive a second priority value, such that after scanning or inputting a code to unlock a modifier, where the unlocked modifier is surfaced for inclusion in the set of modifiers, the unlocked modifier is presented at a position after a sponsored modifier, but before other modifiers which are neither sponsored or unlocked. In some instances, geolocation is used to unlock a modifier. In these instances, a geolocation modifier may be treated as an unlocked modifier. Although described with respect to an example set of rules, it should be understood that any number or relation of rules may be used such as rules for logos, geolocation, weather, multiple objects, and other suitable rules.

Figure 14:
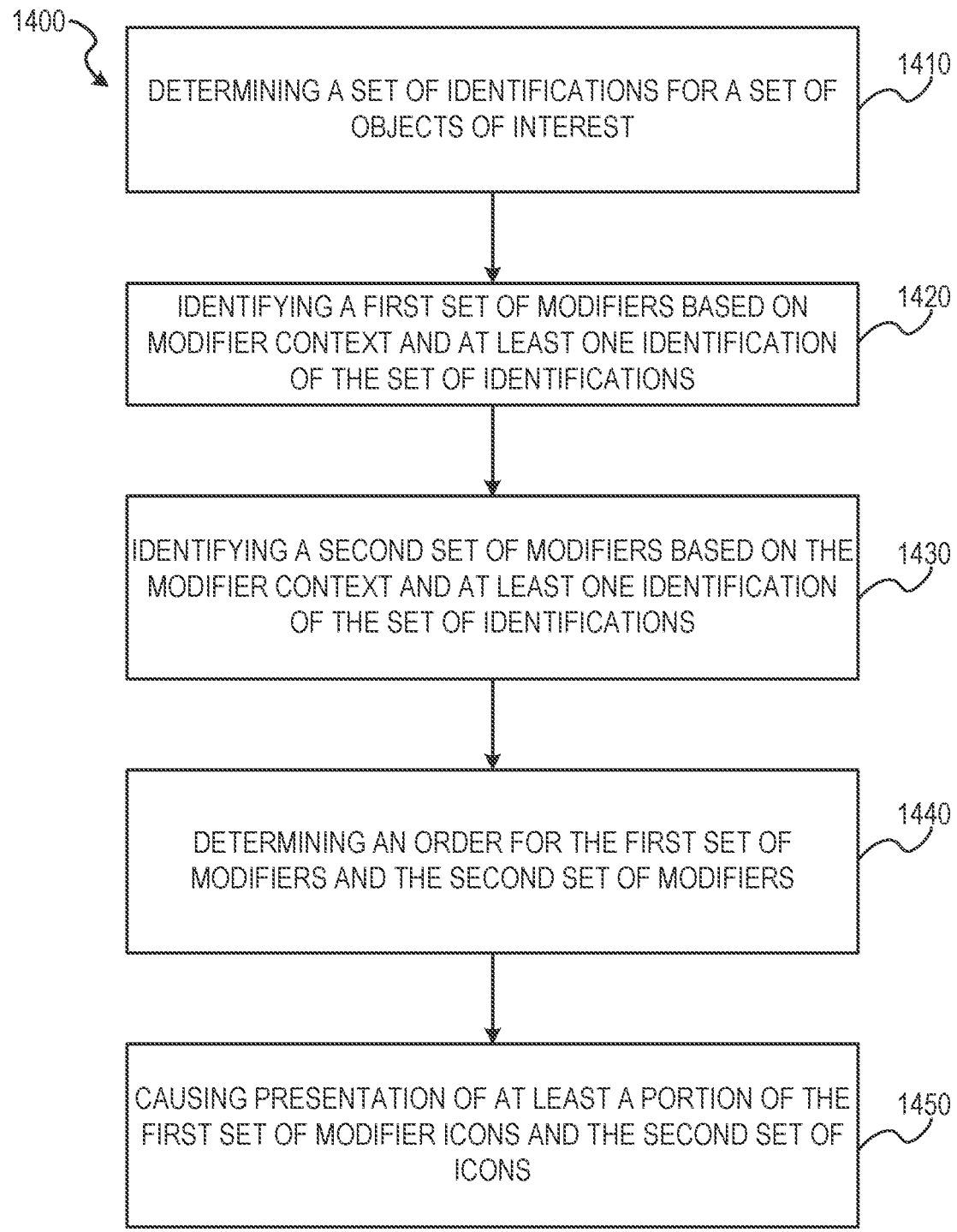
FIG. 14 is a flow diagram illustrating an example method for identifying and ordering a set of image modifiers, according to some example embodiments.

FIG. 14 depicts a flow diagram illustrating an example method 1400 for determining a modifier context and providing an ordered set of modifiers within a user interface, according to embodiments of the present disclosure. The operations of the method 1400 may be performed by components of the image capture system 160, and are so described for purposes of illustration. In some embodiments, operations of the method 1400 incorporate one or more operations of the method 300, are performed as operations within the method 300, or are performed as sub-operations of one or more operations of the method 300. For example, the method 300 may identify a plurality of sets of modifiers. In such embodiments, the set of modifiers identified by operation 330 may include a first set of modifiers and a second set of modifiers and the method 1400 can identify and order a plurality of sets of modifiers, as described below.

In operation 1410, the identification component 230 determines a set of identifications for a set of objects of interest depicted within the field of view of the image capture device. In some embodiments, each identification corresponds to an object of interest of the set of objects of interest. The identification component 230 may determine the set of identifications in a manner similar to or the same as described above with respect to operation 310. For example, the identification component 230 may determine characteristics of the objects of interest within the field of view. Based on the characteristics of each object of interest, the identification component 230 may determine an identification. The identifications of each object of interest may be grouped together as the set of identifications for the set of objects of interest.

In operation 1420, the identification component 230 identifies the first set of modifiers based on the modifier context and at least one identification of the set of identifications. In some embodiments, the first set of modifiers has a first compatibility value. The first compatibility value indicates a compatibility of the first set of modifiers to at least one of the object of interest of the set of objects of interest. The first set of modifiers may be identified in a manner similar to or the same as described above with respect to operation 330.

In operation 1430, the identification component 230 identifies a second set of modifiers based on the modifier context and at least one identification of the set of identifications. In some embodiments, the second set of identifiers has a second compatibility value. The second compatibility value may indicate a compatibility of the second set of modifiers to at least one of the objects of interest of the set of objects of interest. The second set of modifiers may be identified in a manner similar to or the same as described above with respect to operation 330.

In some instances, the second set of modifiers has a third compatibility value. The third compatibility value may indicate a compatibility of the second set of modifiers with the at least one object of interest determined to be compatible with the first set of modifiers. The third compatibility value may be less than the first compatibility value.

In operation 1440, the order component 240 determines an order for the first set of modifiers and the second set of modifiers. In some embodiments, the order is determined based on the modifier context and at least a portion of the identifications of the set of objects of interest. The order component 240 may determine the order for the first set of modifiers and the second set of modifiers in a manner similar to or the same as described above with respect to operation 340. In some embodiments, the order component 240 determines a presentation order for each set of modifiers (e.g., the first set of modifiers and the second set of modifiers). The order component 240 may then select a set of modifiers to be presented first, based on the compatibility values associated with each set of modifiers. The order component 240 may also select the set of modifiers to be presented first based on a relation of a category or type of modifier, associated with each set of modifiers, with the objects of interest to be modified. In some embodiments, the order component 240 determines the order for the first set of modifiers and the second set of modifiers by ordering individual modifiers regardless of a status of the modifier as being associated with the first set of modifiers or the second set of modifiers.

In embodiments where the identification component 230 identifies a first set of modifiers and a second set of modifiers, the order component 240 determines the order for the first set of modifiers and the second set of modifiers. The order may be determined based on the modifier context and at least a portion of the identifications of the set of objects of interest. In some instances, the order determines the placement of the modifiers of the first set of modifiers with respect to the modifiers of the second set of modifiers. In some embodiments, the order determines an order for modifiers within each set. In these instances, modifiers within a set of modifiers may be reordered or repositioned based on the modifier context and identifications of the objects of interest.

As described above, in some instances, the identification component 230 surfaces and the order component 240 orders multiple sets of modifiers (e.g., each set of modifiers associated with a distinct modifier category). The order component 240 may surface up to a predetermined number of modifiers per set of modifiers. For example, where three sets of modifiers are surfaced, each associated with a different modifier category, a first set of modifiers may include X modifiers, a second set of modifiers may include Y modifiers, and a third set of modifiers may include Z modifiers. In some instances, X, Y, and Z are the same number. Where a modifier category includes a lower number of modifiers, two or more of the sets of modifiers may include the same number of modifiers, while the third set of modifiers includes a lower number of modifiers.

In some instances, a modifier may be associated with more than one modifier category. Where two or more modifier categories cause a single modifier to be included in two or more sets of modifiers surfaced by the identification component 230 or the order component 240, the components of the image capture system 160 may eliminate the modifier from one or more sets of modifiers based on the modifier context. In some instances, elimination of the modifier may be temporary and applied to a specified set of modifiers (e.g., the first set of modifiers or the second set of modifiers) to preclude duplication of modifiers or modifier icons. In some embodiments, the modifier icon, for a modifier with two categories, may be placed at a junction between the first set of modifiers and the second set of modifiers. The modifier icon with two categories may then serve as a union point for the two sets of modifiers or preclude duplicate presentation of the modifier.

In operation 1450, the presentation component 270 causes presentation of at least a portion of a first set of modifier icons. The presentation component 270 may also cause presentation of at least a portion of a second set of modifier icons. Each modifier icon of the first set of modifier icons may correspond to a modifier of the first set of modifiers. Each modifier icon of the second set of modifier icons may correspond to a modifier of the second set of modifiers. The presentation component 270 may cause presentation of the portion of modifier icons in a manner similar to or the same as described above with respect to operation 350.

In some embodiments, where the image capture system 160 identifies a first set of modifiers and a second set of modifiers, the presentation component 270 causes presentation of a first set of modifier icons and at least a portion of a second set of modifier icons. Each modifier icon of the first set of modifier icons corresponds to a modifier of the first set of modifiers. Each modifier icon of the second set of modifier icons corresponds to a modifier of the second set of modifiers. In some embodiments, the combination of first set of modifier icons and second set of modifier icons are presented according to the order determined as described above. In some instances, the order defines an organization and presentation scheme for positioning modifiers within each set of modifiers.

Figure 15:
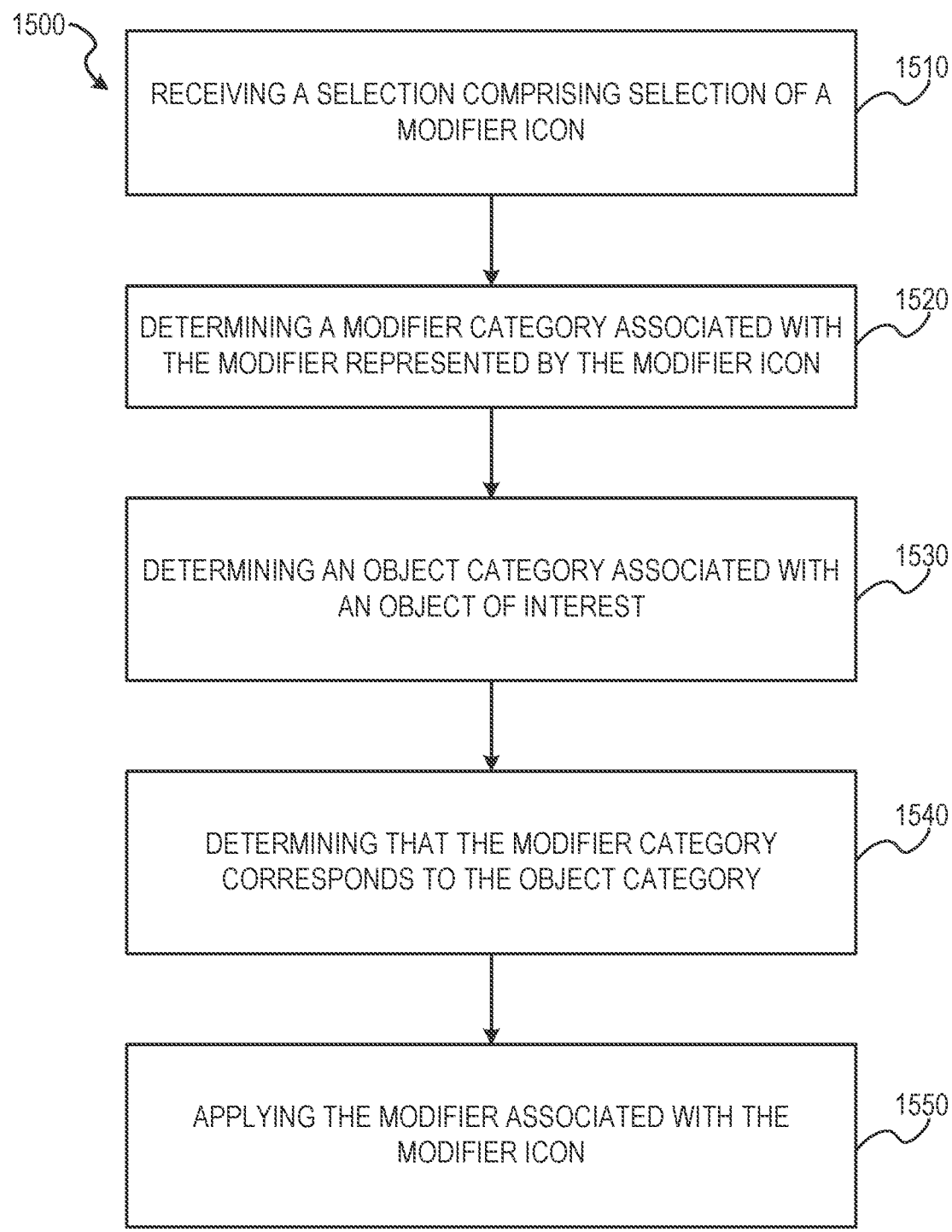
FIG. 15 is a flow diagram illustrating an example method for identifying and ordering a set of image modifiers, according to some example embodiments.

FIG. 15 depicts a flow diagram illustrating an example method 1500 for determining a modifier context and providing an ordered set of modifiers within a user interface, according to embodiments of the present disclosure. The operations of the method 1500 may be performed by components of the image capture system 160, and are so described for purposes of illustration. In some embodiments, operations of the method 1500 incorporate one or more operations of the methods 300 or 1400, are performed as operations within the methods 300 or 1400, or are performed as sub-operations of one or more operations of the methods 300 or 1400. For example, the method 300 may identify a plurality of sets of modifiers. In such embodiments, the selection of operation 310 is a first selection within a graphical user interface.

In operation 1510, the interaction component 260 receives a second selection. The second selection comprising selection of a modifier icon presented within the user interface. The second selection may be received after display of the modifiers or modifier icons, as described above with respect to operations 350 or 1450. The interaction component 260 may receive the second selection as a user interface interaction. For example, the interaction component 260 may identify a touchscreen interaction, such as a tap, or a device interaction, such as a mouse click, selecting a portion of the graphical user interface, pixel location, coordinates, or other representation of a part of one of the modifier icons displayed on the graphical user interface.

In operation 1520, the identification component 230 determining a modifier category associated with the modifier represented by the modifier icon. The identification component 230 may determine the modifier category in a manner similar to or the same as described above with respect to operations 320 or 330. The modifier category may be contained in a table, metadata file, or other data structure associated with the modifier icon. Upon selection of the modifier icon, in some embodiments, the identification component 230 performs one or more look-up operations to identify the modifier category, type, or other information associated with the modifier icon.

In operation 1530, the identification component 230 determining an object category associated with an object of interest. The object category may be used, at least in part, to determine the modifier context. The identification component 230 may determine the object category by comparing characteristics of the object of interest or an identifier for the object of interest with known object categories. For example, the identification component 230 may use the characteristics or the identifier as keywords associated with the object of interest. The identification component 230 may then compare the keywords of the object of interest with keywords associated with known object categories in a database associated with the image capture system 160. The identification component 230 may select the object category which contains or is associated with one or more keywords matching keywords for the object of interest. In some embodiments, the identification component 230 determines the object category based on the selection received in operation 310. In such embodiments, a position of the selection may indicate an object category. For example, where the selection is proximate to a face, scenery, or a surface, the identification component 230 may select an object category for faces, air (e.g., scenery), or ground (e.g., surfaces), respectively.

In operation 1540, the identification component 230 determines that the modifier category corresponds to the object category. In some embodiments, the identification component 230 determines the modifier category corresponds to the object category by comparing keywords associated with each of the modifier category and the object category. The identification component 230 may also query a lookup table or other data structure associating modifiers with object categories. Where an object category is assigned to a modifier or a modifier category within the data structure, the identification component 230 may determine a correspondence between the modifier category and the object category. Although described with respect to specified example embodiments, it should be understood that the identification component 230 may determine the correspondence in any suitable manner.

In operation 1550, the presentation component 270 applies the modifier associated with the modifier icon which is indicated by the second selection. The presentation component 270 may apply the modifier in response to the identification component 230 determining the modifier category corresponds to the object category. In some embodiments, the presentation component 270 applies the modifier by changing, editing, correcting, removing components, adding components, or otherwise modifying at least one aspect of the image or video stream associated with the object of interest. For example, where the object of interest is a face, the presentation component 270 may modify a depiction of the face (e.g., applying cat ears and nose) in the image or in a real-time video stream as the video stream is being captured by the image capture system 160.

Figure 16:
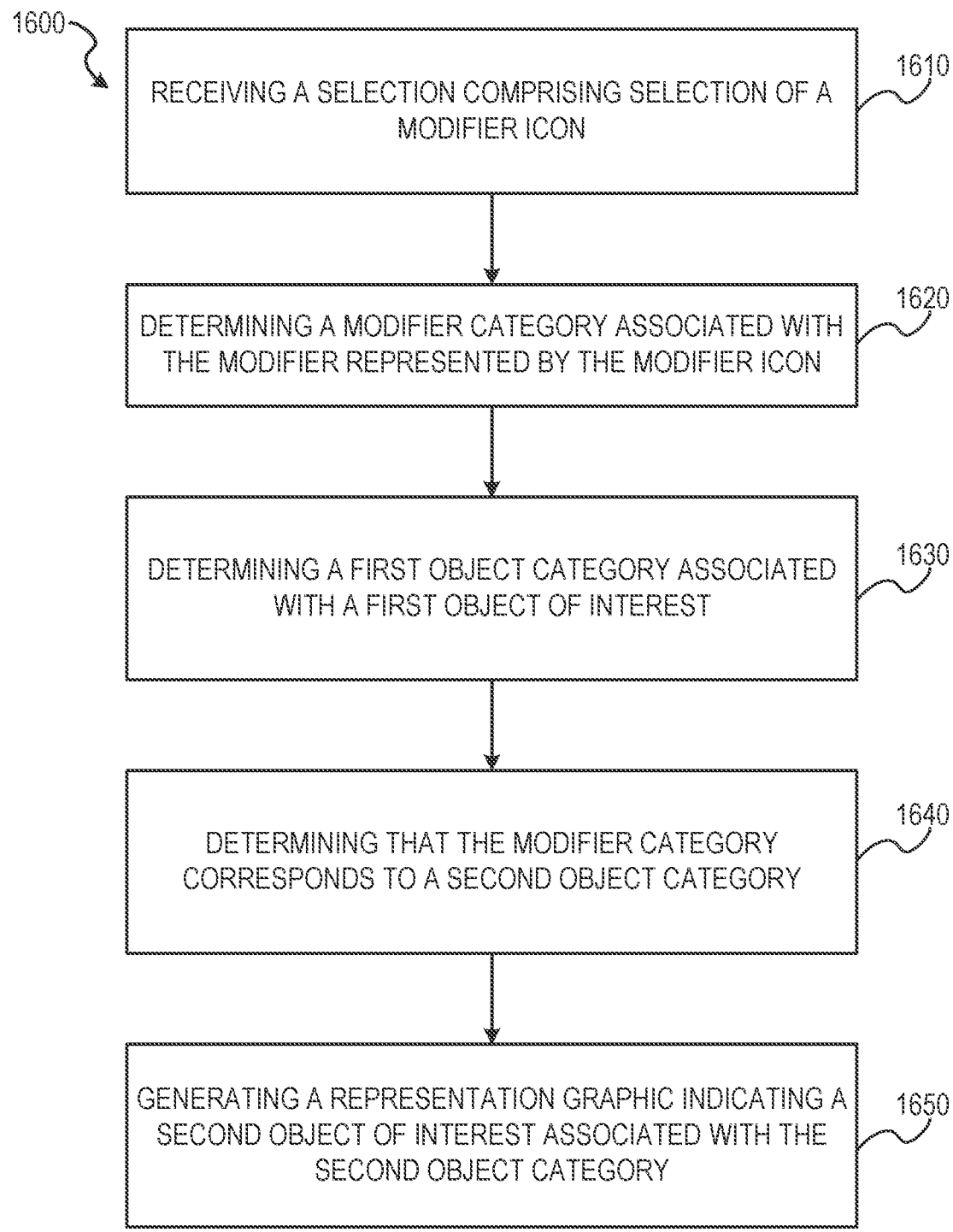
FIG. 16 is a flow diagram illustrating an example method for identifying and ordering a set of image modifiers, according to some example embodiments.

FIG. 16 depicts a flow diagram illustrating an example method 1600 for determining a modifier context and providing an ordered set of modifiers within a user interface, according to embodiments of the present disclosure. The operations of the method 1600 may be performed by components of the image capture system 160, and are so described for purposes of illustration. In some embodiments, operations of the method 1600 incorporate one or more operations of the methods 300, 1400 or 1500, are performed as operations within the methods 300, 1400 or 1500, or are performed as sub-operations of one or more operations of the methods 300, 1400 or 1500. For example, the method 300 may identify a plurality of sets of modifiers. In such embodiments, the selection of operation 310 is a first selection within a graphical user interface.

In operation 1610, the interaction component 260 receives a second selection of a modifier icon presented within the user interface. The interaction component 260 may receive the second selection of the modifier icon in a manner similar to or the same as described above with respect to operation 1510. The selection may be received in the form of a user interaction with one or more of a graphical user interface, an input component of a client device 110, a visual cue, an audio cue, or any other suitable selection method.

In operation 1620, the identification component 230 determines a modifier category associated with the modifier represented by the modifier icon. In some embodiments, the identification component 230 determines the modifier category in a manner similar to or the same as described above with respect to operation 1520. For example, the identification component 230 may determine the modifier category based on the interaction component 260 passing the modifier category to the identification component 230 upon receipt of the second selection. The identification component 230 may also access one or more data structures associated with the modification icon to query, search, or otherwise look-up the modifier category for the modifier icon.

In operation 1630, the identification component 230 determines a first object category associated with a first object of interest. The identification component 230 also determines a second object category associated with a second object of interest. The first object of interest may be used, at least in part, to determine the modifier context. The first object category may be determined in a manner similar to or the same as described above with respect to operation 1530, for the first object of interest.

In operation 1640, the identification component 230 determines the modifier category corresponds to a second object category. In this instance, the identification component 230 determines that the selected modifier corresponds to an object of interest, depicted in the field of view, which is different than the object of interest used to identify the modifiers associated with the modifier icons. In some embodiments, the identification component 230 determines the keywords for the modifier category fail to match keywords associated with the first object category. The identification component 230 may also determine the modifier category corresponds to the second object category by querying a data structure associated with the modifier icon or the modifier category. The identification component 230 may identify, within the data structure, that the second object category is associated or assigned to the modifier category. In such embodiments, the first object category may not be associated with the modifier category.

In operation 1650, the presentation component 270 generates a representation graphic. In some embodiments, the representation graphic indicates the second object of interest identified within the field of view of the image capture device by the selection. The representation graphic may include a mesh overlaid on the second object of interest. For example, where the first object of interest is a face, with a mesh previously generated and displayed for the face, the second object of interest may be an area (e.g., air or sky) depicted near the face. Upon determining the modifier category for the area is different than the modifier category for the face, the presentation component 270 may generate and present the mesh in a manner similar to that shown in FIG. 7. The mesh may be generated in a manner similar to or the same as described above with respect to operation 310 or FIGS. 5, 7, and 9.

In some instances, the user interface is divided among differing display areas. The display areas may correspond to specified interaction operations suitable for the display area. For example, a portion of the user interface may be limited to interaction with lenses, modifiers, or filters, after a set of modifiers or a portion of a set of modifiers has been displayed. A portion of the user interface may be configured to change modes of operation between image capture, display, playback, and other suitable operative modes. In some instances, specified user interactions may be allowed in any area of the user interface. For example, in some instances a double tap within the user interface may cause the computing device to switch image capture input (e.g., switching between image capture devices forward and rear). By way of further example, a single tap may capture a still image, while a sustained touch may capture a video. Further examples include a tap, causing the image capture device to focus the field of view on the tapped location.

After selection of a modifier, the second selection, a subsequent selection may perform one or more operations. In some embodiments, a subsequent selection causes a change from a front facing image capture device to a rear facing image capture device may retain the modifiers presented within the modifier carousel, as determined in the methods 300, 1400, 1500, or 1600. The modifier in the changed image capture mode may operate as normal or previously operable.

A modifier context may cause subsequent selections to operate differently where the subsequent selection causes a change in the modifier context or indicates a combined context. For example, where a face and air lens (e.g., causing modification of both a face and air or an atmosphere around the face), as shown in Tables 1-4, is operating and a subsequent selection causes a change from a front image capture device to a rear image capture device, the field of view may be modified to represent an active view of the previously selected modifier (e.g., lens, filter, or set of add-on graphical elements). For example, if a user has selected a modifier generating an overlay of an old man smoking which modifies a face depicted within the field of view, a subsequent selection may change the camera view from the front image capture device to a rear image capture device. Upon change in the camera view, the field of view of the currently operative image capture device is presented in the context of the old man smoking, acting as a first-person point of view. In these instances, the modifier carousel may remain in an unaltered state, prior to the subsequent selection.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 17:
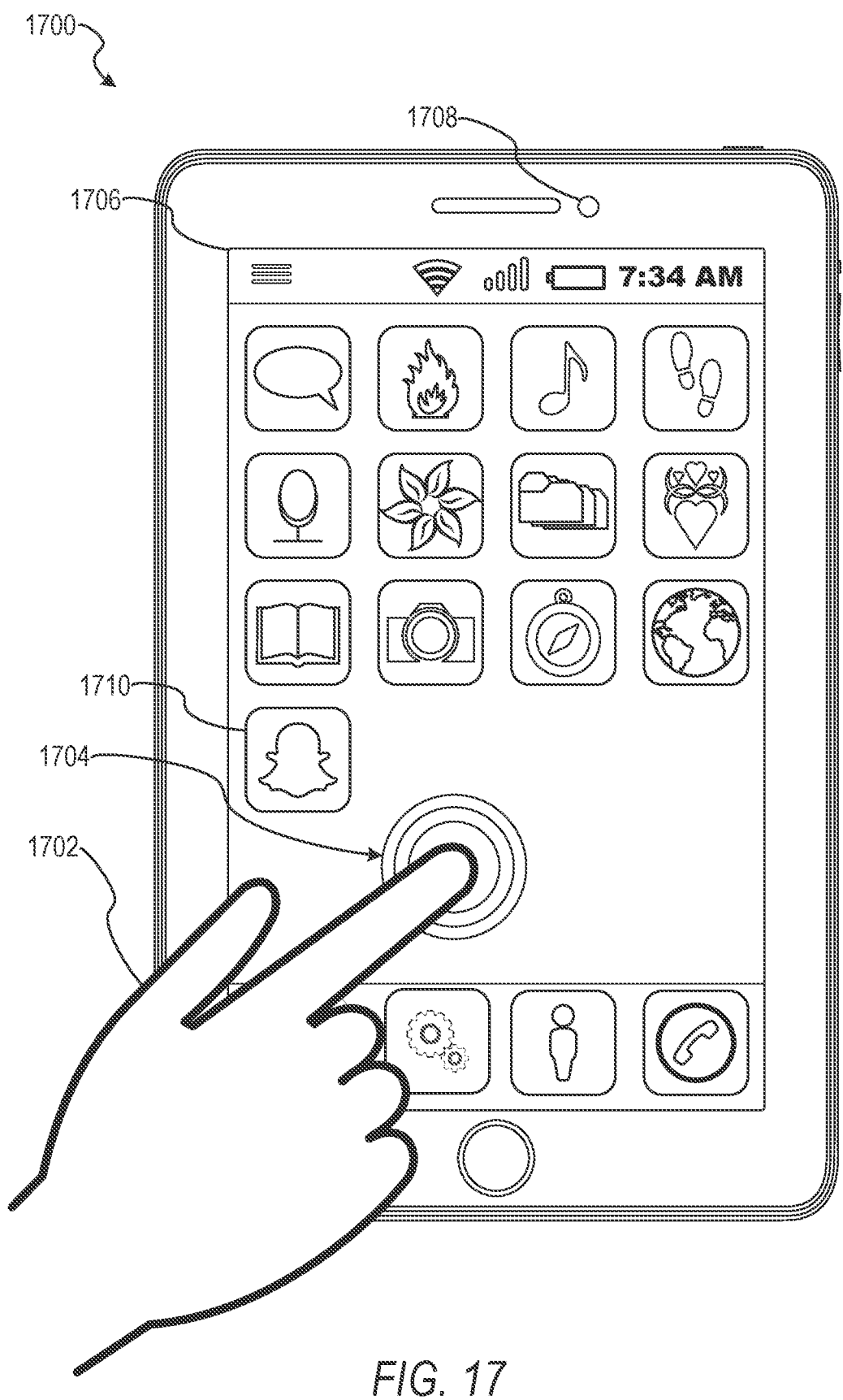
FIG. 17 is a user interface diagram depicting an example mobile device and mobile operating system interface, according to some example embodiments.

FIG. 17 illustrates an example mobile device 1700 executing a mobile operating system (e.g., IOS™, ANDROID™, WINDOWS® Phone, or other mobile operating systems), consistent with some embodiments. In one embodiment, the mobile device 1700 includes a touch screen operable to receive tactile data from a user 1702. For instance, the user 1702 may physically touch 1704 the mobile device 1700, and in response to the touch 1704, the mobile device 1700 may determine tactile data such as touch location, touch force, or gesture motion. In various example embodiments, the mobile device 1700 displays a home screen 1706 (e.g., Springboard on IOS™) operable to launch applications or otherwise manage various aspects of the mobile device 1700. In some example embodiments, the home screen 1706 provides status information such as battery life, connectivity, or other hardware statuses. The user 1702 can activate user interface elements by touching an area occupied by a respective user interface element. In this manner, the user 1702 interacts with the applications of the mobile device 1700. For example, touching the area occupied by a particular icon included in the home screen 1706 causes launching of an application corresponding to the particular icon.

The mobile device 1700, as shown in FIG. 15, includes an imaging device 1708. The imaging device may be a camera or any other device coupled to the mobile device 1700 capable of capturing a video stream or one or more successive images. The imaging device 1708 may be triggered by the image capture system 160 or a selectable user interface element to initiate capture of a video stream or succession of frames and pass the video stream or succession of images to the image capture system 160 for processing according to the one or more methods described in the present disclosure.

Many varieties of applications (also referred to as "apps") can be executing on the mobile device 1700, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1700 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1700 includes a social messaging app 1710 such as SNAPCHAT® that, consistent with some embodiments, allows users to exchange ephemeral messages that include media content. In this example, the social messaging app 1710 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present invention.

In some embodiments, an ephemeral message system may include messages having ephemeral video clips or images which are deleted following a deletion trigger event such as a viewing time or viewing completion. In such embodiments, a device implementing the image capture system 160 may identify, track, extract, and generate representations of a face within the ephemeral video clip, as the ephemeral video clip is being captured by the device and transmit the ephemeral video clip to another device using the ephemeral message system.

Software Architecture

Figure 18:
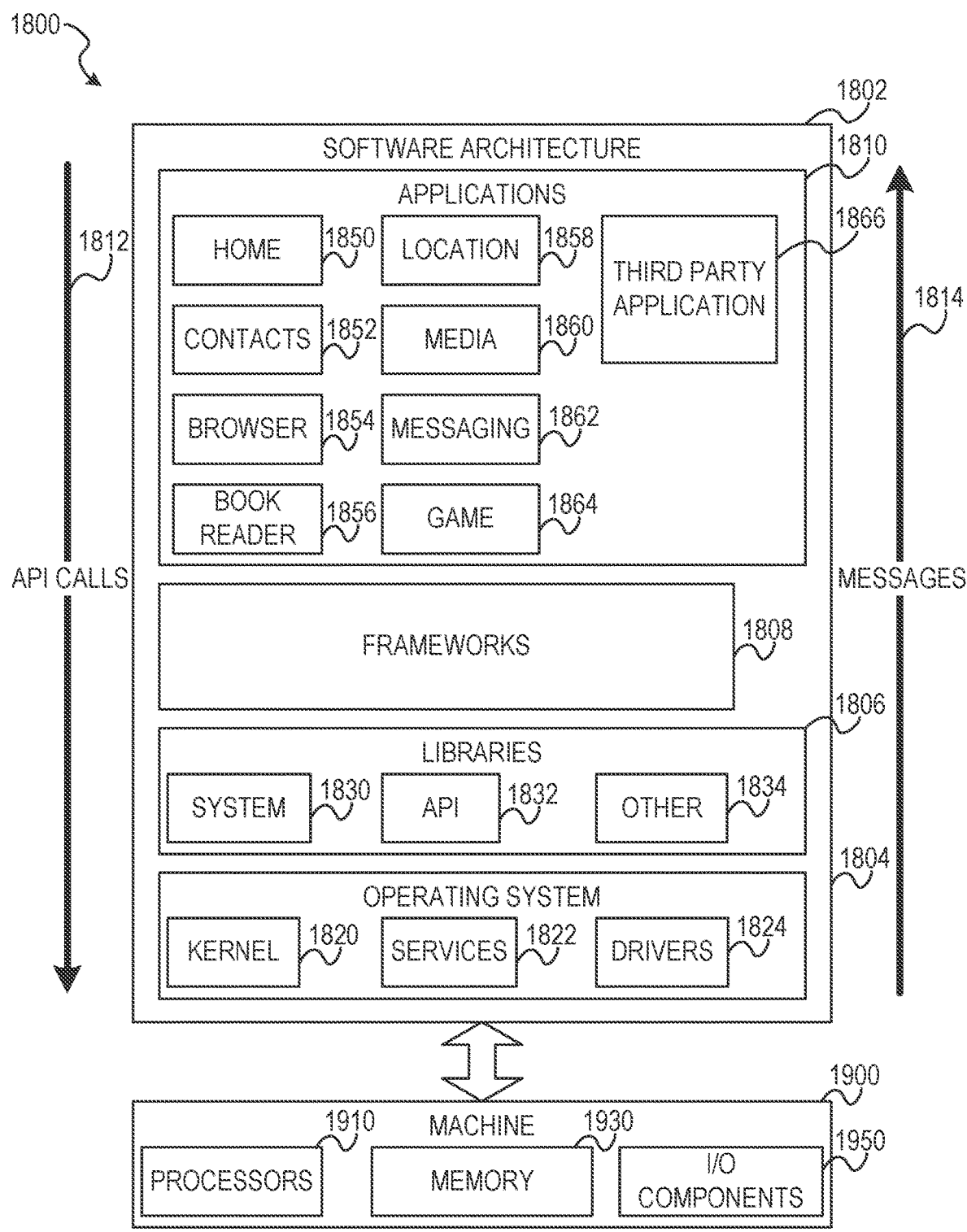
FIG. 18 is a block diagram illustrating an example of a software architecture that may be installed on a machine, according to some example embodiments.

FIG. 18 is a block diagram 1800 illustrating an architecture of software 1802, which can be installed on the devices described above. FIG. 18 is merely a non-limiting example of a software architecture, and it will be appreciated that many other architectures can be implemented to facilitate the functionality described herein. In various embodiments, the software 1802 is implemented by hardware such as machine a 1900 of FIG. 19 that includes processors 1910, memory 1930, and I/O components 1950. In this example architecture, the software 1802 can be conceptualized as a stack of layers where each layer may provide a particular functionality. For example, the software 1802 includes layers such as an operating system 1804, libraries 1806, frameworks 1808, and applications 1810. Operationally, the applications 1810 invoke application programming interface (API) calls 1812 through the software stack and receive messages 1814 in response to the API calls 1812, consistent with some embodiments.

In various implementations, the operating system 1804 manages hardware resources and provides common services. The operating system 1804 includes, for example, a kernel 1820, services 1822, and drivers 1824. The kernel 1820 acts as an abstraction layer between the hardware and the other software layers consistent with some embodiments. For example, the kernel 1820 provides memory management, processor management (e.g., scheduling), component management, networking, and security settings, among other functionality. The services 1822 can provide other common services for the other software layers. The drivers 1824 are responsible for controlling or interfacing with the underlying hardware, according to some embodiments. For instance, the drivers 1824 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1806 provide a low-level common infrastructure utilized by the applications 1810. The libraries 1806 can include system libraries 1830 (e.g., C standard library) that can provide functions such as memory allocation functions, string manipulation functions, mathematic functions, and the like. In addition, the libraries 1806 can include API libraries 1832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1806 can also include a wide variety of other libraries 1834 to provide many other APIs to the applications 1810.

The frameworks 1808 provide a high-level common infrastructure that can be utilized by the applications 1810, according to some embodiments. For example, the frameworks 1808 provide various graphic user interface (GUI) functions, high-level resource management, high-level location services, and so forth. The frameworks 1808 can provide a broad spectrum of other APIs that can be utilized by the applications 1810, some of which may be specific to a particular operating system or platform.

In an example embodiment, the applications 1810 include a home application 1850, a contacts application 1852, a browser application 1854, a book reader application 1856, a location application 1858, a media application 1860, a messaging application 1862, a game application 1864, and a broad assortment of other applications such as a third-party application 1866. According to some embodiments, the applications 1810 are programs that execute functions defined in the programs. Various programming languages can be employed to create the applications 1810, structured in a variety of manners, such as object-oriented programming languages (e.g., Objective-C, Java, or C++) or procedural programming languages (e.g., C or assembly language). In a specific example, the third-party application 1866 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third-party application 1866 can invoke the API calls 1812 provided by the operating system 1804 to facilitate functionality described herein.

Example Machine Architecture and Machine-Readable Medium

Figure 19:
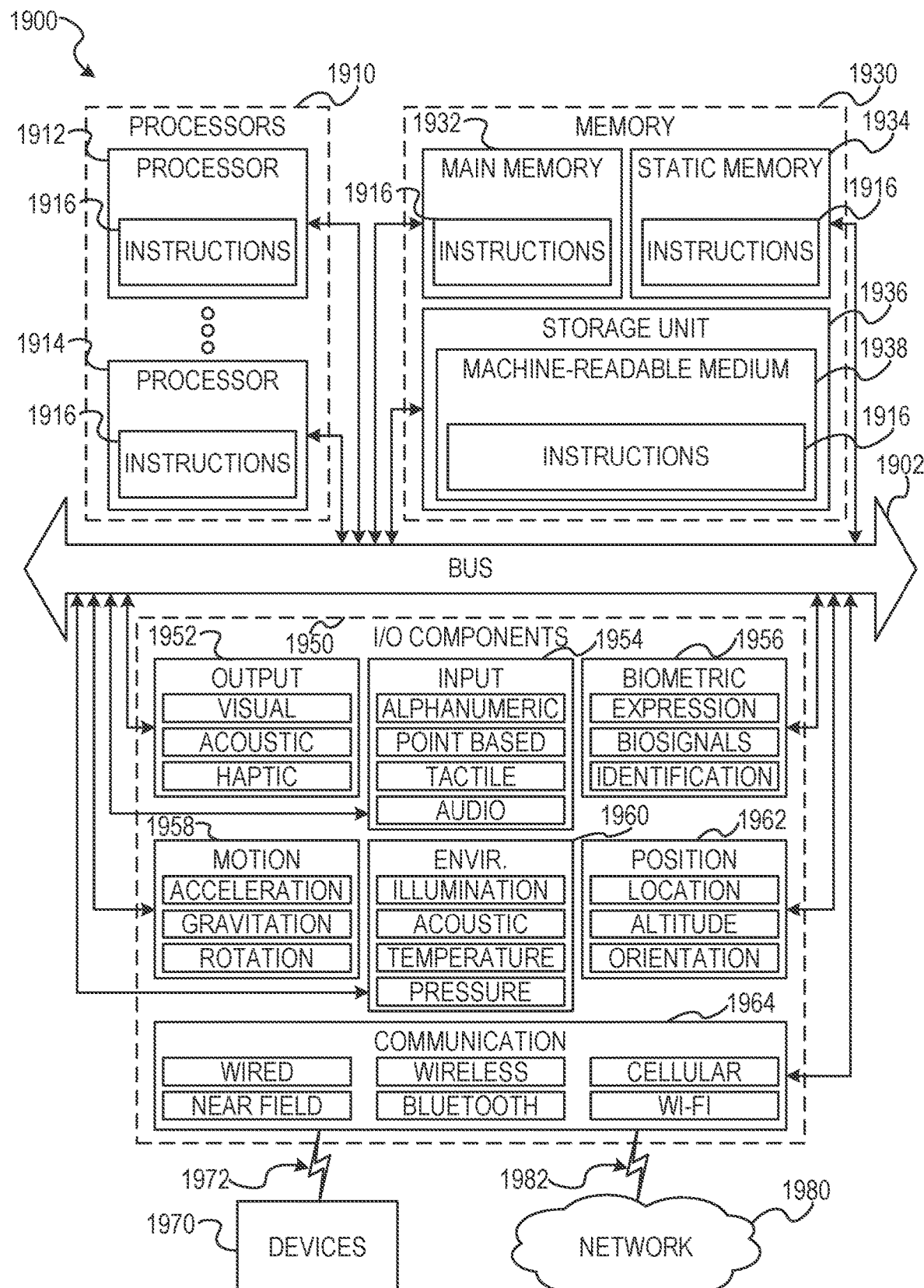
FIG. 19 is a block diagram presenting a diagrammatic representation of a machine in the form of a computer system within which a set of instructions may be executed for causing the machine to perform any of the methodologies discussed herein, according to an example embodiment.

FIG. 19 is a block diagram illustrating components of a machine 1900, according to some embodiments, able to read instructions (e.g., processor executable instructions) from a machine-readable medium (e.g., a non-transitory processor-readable storage medium or processor-readable storage device) and perform any of the methodologies discussed herein. Specifically, FIG. 19 shows a diagrammatic representation of the machine 1900 in the example form of a computer system, within which instructions 1916 (e.g., software, a program, an application, an applet, an app, or other executable code) for causing the machine 1900 to perform any of the methodologies discussed herein can be executed. In alternative embodiments, the machine 1900 operates as a standalone device or can be coupled (e.g., networked) to other machines. In a networked deployment, the machine 1900 may operate in the capacity of a server machine or a client machine in a server-client network environment, or as a peer machine in a peer-to-peer (or distributed) network environment. The machine 1900 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1916, sequentially or otherwise, that specify actions to be taken by the machine 1900. Further, while only a single machine 1900 is illustrated, the term "machine" shall also be taken to include a collection of machines 1900 that individually or jointly execute the instructions 1916 to perform any of the methodologies discussed herein.

In various embodiments, the machine 1900 comprises processors 1910, memory 1930, and I/O components 1950, which can be configured to communicate with each other via a bus 1902. In an example embodiment, the processors 1910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1912 and a processor 1914 that may execute the instructions 1916. The term "processor" is intended to include multi-core processors that may comprise two or more independent processors (also referred to as "cores") that can execute instructions contemporaneously. Although FIG. 19 shows multiple processors, the machine 1900 may include a single processor with a single core, a single processor with multiple cores (e.g., a multi-core processor), multiple processors with a single core, multiple processors with multiples cores, or any combination thereof.

The memory 1930 comprises a main memory 1932, a static memory 1934, and a storage unit 1936 accessible to the processors 1910 via the bus 1902, according to some embodiments. The storage unit 1936 can include a machine-readable medium 1938 on which are stored the instructions 1916 embodying any of the methodologies or functions described herein. The instructions 1916 can also reside, completely or at least partially, within the main memory 1932, within the static memory 1934, within at least one of the processors 1910 (e.g., within the processor's cache memory), or any suitable combination thereof, during execution thereof by the machine 1900. Accordingly, in various embodiments, the main memory 1932, the static memory 1934, and the processors 1910 are considered machine-readable media 1938.

As used herein, the term "memory" refers to a machine-readable medium 1938 able to store data temporarily or permanently and may be taken to include, but not be limited to, random-access memory (RAM), read-only memory (ROM), buffer memory, flash memory, and cache memory. While the machine-readable medium 1938 is shown in an example embodiment to be a single medium, the term "machine-readable medium" should be taken to include a single medium or multiple media (e.g., a centralized or distributed database, or associated caches and servers) able to store the instructions 1916. The term "machine-readable medium" shall also be taken to include any medium, or combination of multiple media, that is capable of storing instructions (e.g., instructions 1916) for execution by a machine (e.g., machine 1900), such that the instructions, when executed by processors of the machine 1900 (e.g., processors 1910), cause the machine 1900 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1950 include a wide variety of components to receive input, provide output, produce output, transmit information, exchange information, capture measurements, and so on. In general, it will be appreciated that the I/O components 1950 can include many other components that are not shown in FIG. 17. The I/O components 1950 are grouped according to functionality merely for simplifying the following discussion, and the grouping is in no way limiting. In various example embodiments, the I/O components 1950 include output components 1952 and input components 1954. The output components 1952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1954 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1950 include biometric components 1956, motion components 1958, environmental components 1960, or position components 1962, among a wide array of other components. For example, the biometric components 1956 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1958 include acceleration sensor components (e.g., accelerometer), gravitation sensor components, rotation sensor components (e.g., gyroscope), and so forth. The environmental components 1960 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1950 may include communication components 1964 operable to couple the machine 1900 to a network 1980 or devices 1970 via a coupling 1982 and a coupling 1972, respectively. For example, the communication components 1964 include a network interface component or another suitable device to interface with the network 1980. In further examples, communication components 1964 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1970 may be another machine or any of a wide variety of peripheral devices (e.g., a peripheral device coupled via a Universal Serial Bus (USB)).

Moreover, in some embodiments, the communication components 1964 detect identifiers or include components operable to detect identifiers. For example, the communication components 1964 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1964, such as location via Internet Protocol (IP) geolocation, location via WI-FI® signal triangulation, location via detecting a BLU-ETOOTH® or NFC beacon signal that may indicate a particular location, and so forth.

Transmission Medium

In various example embodiments, portions of the network 1980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1980 or a portion of the network 1980 may include a wireless or cellular network, and the coupling 1982 may be a Code Division Multiple Access (CDMA) connection, a Global System for Mobile communications (GSM) connection, or another type of cellular or wireless coupling. In this example, the coupling 1982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1916 are transmitted or received over the network 1980 using a transmission medium via a network interface device (e.g., a network interface component included in the communication components 1964) and utilizing any one of a number of well-known transfer protocols (e.g., Hypertext Transfer Protocol (HTTP)). Similarly, in other example embodiments, the instructions 1916 are transmitted or received using a transmission medium via the coupling 1972 (e.g., a peer-to-peer coupling) to the devices 1970. The term "transmission medium" shall be taken to include any intangible medium that is capable of storing, encoding, or carrying the instructions 1916 for execution by the machine 1900, and includes digital or analog communications signals or other intangible media to facilitate communication of such software.

Furthermore, the machine-readable medium 1938 is non-transitory (in other words, not having any transitory signals) in that it does not embody a propagating signal. However, labeling the machine-readable medium 1938 "non-transitory" should not be construed to mean that the medium is incapable of movement; the medium should be considered as being transportable from one physical location to another. Additionally, since the machine-readable medium 1938 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   determining a modifier context based at least in part on one or more characteristics of an object of interest in an image;
   identifying a set of image modifiers based on the modifier context, each image modifier of the set of image modifiers comprising a modifier icon;
   in response to identifying the set of image modifiers, determining an order of the set of image modifiers based on one or more related modifier categories:

ranking at least a portion of the image modifiers based on the determined order; and causing presentation, within a user interface, of the modifier icons in an order based on the modifier context and the ranking.

2. The method of claim 1, wherein ranking at least the portion of the set image modifiers comprises ranking a first portion of the identified set of image modifiers based on a primary ordering characteristic.

3. The method of claim 2, further comprising:
ranking a second portion of the identified set of image modifiers based on a second determined order.

4. The method of claim 3, wherein the second determined order is based on a popularity-based algorithm.

5. The method of claim 1, wherein the modifier icons are selectable user interface elements.

6. The method of claim 1, wherein the object of interest is identified automatically without input from a user.

7. The method of claim 1, further comprising:
receiving a second selection of a modifier icon presented within the user interface;
determining a modifier category associated with each image modifier represented by the modifier icon;
determining an object category associated with an object of interest used at least in part to determine the modifier context;
determining the modifier category corresponds to the object category; and
applying the modifier associated with the modifier icon indicated by the second selection.

8. The method of claim 7, wherein the selection within the user interface is a first selection, the method further comprising:
receiving a second selection of a modifier icon presented within the user interface;
determining a modifier category associated with the modifier represented by the modifier icon;
determining a first object category associated with a first object of interest and a second object category associated with a second object of interest, the first object of interest used at least in part to determine the modifier context;
determining the modifier category corresponds to the second object category; and
generating a representation graphic indicating the second object of interest identified within a field of view of an image capture device by the selection, the representation graphic including a mesh overlaid on the second object of interest.

9. A device comprising:
one or more processors; and
a processor-readable storage device coupled to the one or more processors, the processor-readable storage device storing processor executable instructions that, when executed by the one or more processors, cause the one or more processors to perform operations comprising:
determining a modifier context based at least in part on one or more characteristics of an object of interest in an image;
identifying a set of image modifiers based on the modifier context, each image modifier of the set of image modifiers comprising a modifier icon; and
in response to identifying the set of image modifiers, determining an order of the set of image modifiers based on one or more related modifier categories:
ranking at least a portion of the image modifiers based on the determined order; and
causing presentation, within a user interface, of the modifier icons in an order based on the modifier context and the ranking.

10. The device of claim 9, wherein ranking at least the portion of the image modifiers comprises ranking a first portion of the identified set of image modifiers based on a primary ordering characteristic.

11. The device of claim 10, further comprising:
ranking a second portion of the identified set of image modifiers based on a second determined order.

12. The device of claim 11, wherein the second determined order is based on a popularity-based algorithm.

13. The device of claim 9, wherein the modifier icons are selectable user interface elements.

14. The device of claim 9, wherein the object of interest is identified automatically without input from a user.

15. The device of claim 9, the operations further comprising:
receiving a second selection of a modifier icon presented within the user interface;
determining a modifier category associated with each image modifier represented by the modifier icon;
determining an object category associated with an object of interest used at least in part to determine the modifier context;
determining the modifier category corresponds to the object category; and
applying the modifier associated with the modifier icon indicated by the second selection.

16. The device of claim 15, wherein the selection within the user interface is a first selection, the operations further comprising:
receiving a second selection of a modifier icon presented within the user interface;
determining a modifier category associated with the modifier represented by the modifier icon;
determining a first object category associated with a first object of interest and a second object category associated with a second object of interest, the first object of interest used at least in part to determine the modifier context;
determining the modifier category corresponds to the second object category; and
generating a representation graphic indicating the second object of interest identified within a field of view of an image capture device by the selection, the representation graphic including a mesh overlaid on the second object of interest.

17. A non-transitory processor-readable storage medium storing processor executable instructions that, when executed by one or more processors of a machine, cause the machine to perform operations comprising:
determining a modifier context based at least in part on one or more characteristics of an object of interest in an image;
identifying a set of image modifiers based on the modifier context, each image modifier of the set of image modifiers comprising a modifier icon;
in response to identifying the set of image modifiers, determining an order of the set of image modifiers based on one or more related modifier categories:
ranking at least a portion of the image modifiers based on the determined order; and
causing presentation, within a user interface, of the modifier icons in an order based on the modifier context and the ranking.

18. The non-transitory processor-readable storage medium of claim 17, wherein ranking at least the portion of the image modifiers comprises ranking a first portion of the identified set of image modifiers based on a primary ordering characteristic.

19. The non-transitory processor-readable storage medium of claim 18, further comprising:
ranking a second portion of the identified set of image modifiers based on a second determined order.

20. The non-transitory processor-readable storage medium of claim 19, wherein the second determined order is based on a popularity-based algorithm.

* * * * *